US010783531B2

(12) United States Patent
Henderson et al.

(10) Patent No.: US 10,783,531 B2
(45) Date of Patent: *Sep. 22, 2020

(54) CARDLESS PAYMENT TRANSACTIONS BASED ON GEOGRAPHIC LOCATIONS OF USER DEVICES

(71) Applicant: Square, Inc., San Francisco, CA (US)

(72) Inventors: William Henderson, San Francisco, CA (US); Jack Dorsey, San Francisco, CA (US); Brian Grassadonia, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,390

(22) Filed: Mar. 29, 2016

(65) Prior Publication Data

US 2016/0210606 A1 Jul. 21, 2016

Related U.S. Application Data

(63) Continuation of application No. 13/627,615, filed on Sep. 26, 2012, now Pat. No. 9,373,112.
(Continued)

(51) Int. Cl.
*G06Q 20/40* (2012.01)
*G06Q 20/32* (2012.01)
(Continued)

(52) U.S. Cl.
CPC ....... *G06Q 30/0201* (2013.01); *G06Q 20/202* (2013.01); *G06Q 20/204* (2013.01);
(Continued)

(58) Field of Classification Search
CPC ...... G06Q 20/40; G06Q 20/32; G06Q 20/401; G06Q 20/3224; G06Q 20/227;
(Continued)

(56) References Cited

U.S. PATENT DOCUMENTS 4,035,614 A 7/1977 Frattarola et al.
4,254,441 A 3/1981 Fisher
(Continued)

FOREIGN PATENT DOCUMENTS

AU 2017208387 A1 8/2017
CA 2 777 885 A1 5/2013
(Continued)

OTHER PUBLICATIONS

Luka Finzgar et al., "Use of NFC and QR code Identification in an Electronic Ticket System for Public Transport," 2011, SoftCOM 2011, pp. 1-7 (Year: 2011).*
(Continued)

*Primary Examiner* — Kenneth Bartley
(74) *Attorney, Agent, or Firm* — Polsinelli PC

(57) ABSTRACT

Techniques directed to performing a cardless payment transaction based on a geographical location of a mobile device are described. The techniques may include displaying a user interface with a list of merchants that are proximate to the mobile device. User input may be received to enable automatic check-in with a merchant. The techniques may further include determining that the mobile device is within a particular distance to the merchant and sending an indication to carry out a cardless payment transaction with the merchant.

23 Claims, 9 Drawing Sheets

Related U.S. Application Data

(60) Provisional application No. 61/612,128, filed on Mar. 16, 2012.

(51) Int. Cl.
*G06Q 20/22* (2012.01)
*G06Q 20/20* (2012.01)
*G06Q 30/06* (2012.01)
*G06Q 30/02* (2012.01)

(52) U.S. Cl.
CPC ........... *G06Q 20/227* (2013.01); *G06Q 20/32* (2013.01); *G06Q 20/3224* (2013.01); *G06Q 20/40* (2013.01); *G06Q 20/401* (2013.01); *G06Q 20/40145* (2013.01); *G06Q 30/0631* (2013.01)

(58) Field of Classification Search
CPC ............... G06Q 20/202; G06Q 20/204; G06Q 20/40145; G06Q 20/22; G06Q 20/20; G06Q 30/0201; G06Q 30/0631; G06Q 30/02; G06Q 30/06
See application file for complete search history.

(56) References Cited

U.S. PATENT DOCUMENTS

| | | |
|---|---|---|
| 4,591,937 A | 5/1986 | Nakarai et al. |
| 4,845,740 A | 7/1989 | Tokuyama et al. |
| 5,266,789 A | 11/1993 | Anglin et al. |
| 5,434,400 A | 7/1995 | Scherzer |
| 5,463,678 A | 10/1995 | Epley, III et al. |
| 5,589,855 A | 12/1996 | Blumstein et al. |
| 5,764,742 A | 6/1998 | Howard et al. |
| 5,850,599 A | 12/1998 | Seiderman |
| 5,945,654 A | 8/1999 | Huang |
| 6,006,109 A | 12/1999 | Shin |
| 6,021,944 A | 2/2000 | Arakaki |
| 6,026,375 A | 2/2000 | Hall et al. |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,341,353 B1 | 1/2002 | Herman et al. |
| 6,363,139 B1 | 3/2002 | Zurek et al. |
| 6,374,176 B1 | 4/2002 | Schmier et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,526,275 B1 * | 2/2003 | Calvert ............. H04M 3/42348 455/418 |
| 6,536,670 B1 | 3/2003 | Postman et al. |
| 6,579,728 B2 | 6/2003 | Grant et al. |
| 6,587,835 B1 | 7/2003 | Treyz et al. |
| 6,612,488 B2 | 9/2003 | Suzuki |
| 6,659,344 B2 | 12/2003 | Otto et al. |
| 6,820,062 B1 | 11/2004 | Gupta et al. |
| 6,832,721 B2 | 12/2004 | Fujii |
| 6,850,147 B2 | 2/2005 | Prokoski et al. |
| 6,868,391 B1 | 3/2005 | Hultgren |
| 6,888,443 B2 | 5/2005 | Ritter |
| 6,896,182 B2 | 5/2005 | Sakaguchi |
| 6,898,598 B2 | 5/2005 | Himmel et al. |
| 6,944,782 B2 | 9/2005 | von Mueller et al. |
| 7,003,316 B1 | 2/2006 | Elias et al. |
| 7,004,382 B2 | 2/2006 | Sandru |
| 7,024,205 B1 | 4/2006 | Hose |
| 7,149,296 B2 | 12/2006 | Brown et al. |
| 7,207,480 B1 * | 4/2007 | Geddes ................. G06Q 20/32 235/379 |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,363,054 B2 | 4/2008 | Elias et al. |
| 7,376,431 B2 | 5/2008 | Niedermeyer |
| 7,376,433 B1 | 5/2008 | Hose |
| 7,376,583 B1 | 5/2008 | Rolf |
| 7,403,762 B2 | 7/2008 | Morgan et al. |
| 7,409,234 B2 | 8/2008 | Glezerman |
| 7,433,452 B2 | 10/2008 | Taylor et al. |
| 7,506,812 B2 | 3/2009 | von Mueller et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| 7,620,404 B2 | 11/2009 | Chesnais et al. |
| 7,684,809 B2 | 3/2010 | Niedermeyer |
| 7,708,189 B1 | 5/2010 | Cipriano |
| 7,711,100 B2 | 5/2010 | Dennis |
| 7,792,709 B1 | 9/2010 | Trandal et al. |
| 7,793,834 B2 | 9/2010 | Hachey et al. |
| 7,810,729 B2 | 10/2010 | Morley |
| 7,831,246 B1 | 11/2010 | Smith et al. |
| 7,831,520 B2 | 11/2010 | Mengerink |
| 7,848,765 B2 | 12/2010 | Phillips et al. |
| 7,869,591 B1 | 1/2011 | Nagel et al. |
| 7,896,248 B2 | 3/2011 | Morley |
| 7,918,394 B1 | 4/2011 | Morley, Jr. |
| 7,945,494 B2 | 5/2011 | Williams |
| 8,050,984 B2 | 11/2011 | Bonner et al. |
| 8,090,351 B2 | 1/2012 | Klein |
| 8,126,806 B1 | 2/2012 | DiMartino et al. |
| 8,135,624 B1 | 3/2012 | Ramalingam et al. |
| 8,140,418 B1 | 3/2012 | Casey et al. |
| 8,160,959 B2 | 4/2012 | Rackley, III et al. |
| 8,231,055 B2 | 7/2012 | Wen |
| 8,239,276 B2 | 8/2012 | Lin et al. |
| 8,285,604 B1 | 10/2012 | Trandal et al. |
| 8,369,842 B2 | 2/2013 | Proctor, Jr. et al. |
| 8,376,239 B1 | 2/2013 | Humphrey |
| 8,396,808 B2 | 3/2013 | Greenspan |
| 8,413,901 B2 | 4/2013 | Wen |
| 8,417,258 B2 | 4/2013 | Barnes, Jr. |
| 8,438,066 B1 | 5/2013 | Yuen et al. |
| 8,463,295 B1 | 6/2013 | Caralis et al. |
| 8,485,440 B1 | 7/2013 | Arora et al. |
| 8,509,734 B1 | 8/2013 | Gupta et al. |
| 8,510,220 B2 | 8/2013 | Rackley, III et al. |
| 8,554,670 B1 * | 10/2013 | Blank ..................... G06Q 50/01 705/1.1 |
| 8,635,157 B2 | 1/2014 | Smith et al. |
| 8,655,782 B2 | 2/2014 | Poon et al. |
| 8,659,427 B2 | 2/2014 | Brown et al. |
| 8,684,261 B2 | 4/2014 | Burdett et al. |
| 8,750,901 B1 | 6/2014 | Gupta et al. |
| 8,766,791 B2 | 7/2014 | Koen et al. |
| 8,972,297 B2 | 3/2015 | Kay et al. |
| 9,055,400 B1 | 6/2015 | Lee |
| 9,113,344 B1 | 8/2015 | Lee |
| 9,204,257 B1 | 12/2015 | Mendelson |
| 9,264,850 B1 | 2/2016 | Lee |
| 9,373,112 B1 | 6/2016 | Henderson et al. |
| 9,407,689 B1 * | 8/2016 | Casares .................. H04L 67/10 |
| 9,451,397 B1 | 9/2016 | Lee |
| 9,576,289 B2 | 2/2017 | Henderson et al. |
| 9,633,352 B2 | 4/2017 | Henderson et al. |
| 9,652,791 B1 | 5/2017 | Brock |
| 9,665,858 B1 | 5/2017 | Kumar |
| 9,730,015 B1 | 8/2017 | Lee |
| 9,741,045 B1 | 8/2017 | Henderson et al. |
| 9,799,034 B1 | 10/2017 | Varma et al. |
| 9,805,370 B1 | 10/2017 | Quigley et al. |
| 9,838,840 B1 | 12/2017 | Lee |
| 9,875,471 B1 | 1/2018 | Myrick et al. |
| 9,924,322 B2 | 3/2018 | Post et al. |
| 9,959,529 B1 | 5/2018 | Varma et al. |
| 10,026,083 B1 | 7/2018 | Varma et al. |
| 10,163,148 B1 | 12/2018 | Chatterjee et al. |
| 10,373,151 B1 | 8/2019 | Lee |
| 2001/0001856 A1 | 5/2001 | Gould et al. |
| 2002/0002507 A1 | 1/2002 | Hatakeyama |
| 2002/0030871 A1 | 3/2002 | Anderson et al. |
| 2002/0049644 A1 | 4/2002 | Kargman |

(56) References Cited

U.S. PATENT DOCUMENTS

| | | | |
|---|---|---|---|
| 2002/0077974 A1 | 6/2002 | Ortiz | |
| 2002/0099648 A1 | 7/2002 | DeVoe et al. | |
| 2002/0108062 A1 | 8/2002 | Nakajima et al. | |
| 2002/0111907 A1 | 8/2002 | Ling | |
| 2002/0169541 A1 | 11/2002 | Bouve et al. | |
| 2002/0181710 A1 | 12/2002 | Adam et al. | |
| 2002/0194121 A1 | 12/2002 | Takayama | |
| 2002/0198806 A1 | 12/2002 | Blagg et al. | |
| 2002/0198818 A1* | 12/2002 | Scott | G06Q 10/0875 705/37 |
| 2003/0004842 A1* | 1/2003 | Williams | G06Q 30/06 705/35 |
| 2003/0061109 A1 | 3/2003 | Banerjee et al. | |
| 2003/0089772 A1 | 5/2003 | Chien | |
| 2003/0132300 A1 | 7/2003 | Dilday et al. | |
| 2003/0135463 A1 | 7/2003 | Brown et al. | |
| 2003/0144040 A1 | 7/2003 | Liu et al. | |
| 2003/0194071 A1* | 10/2003 | Ramian | H04M 15/00 379/114.19 |
| 2003/0200180 A1* | 10/2003 | Phelan, III | G06Q 20/04 705/65 |
| 2004/0002897 A1 | 1/2004 | Vishik | |
| 2004/0012875 A1 | 1/2004 | Wood | |
| 2004/0015475 A1 | 1/2004 | Scheepsma | |
| 2004/0041911 A1 | 3/2004 | Odagiri et al. | |
| 2004/0049451 A1 | 3/2004 | Berardi et al. | |
| 2004/0064378 A1* | 4/2004 | Yoshida | G06Q 10/087 705/26.1 |
| 2004/0093274 A1 | 5/2004 | Vanska et al. | |
| 2004/0093281 A1 | 5/2004 | Silverstein et al. | |
| 2004/0093496 A1 | 5/2004 | Colnot | |
| 2004/0104268 A1 | 6/2004 | Bailey | |
| 2004/0107170 A1* | 6/2004 | Labrou | G06Q 20/02 705/64 |
| 2004/0127256 A1 | 7/2004 | Goldthwaite et al. | |
| 2004/0128256 A1 | 7/2004 | Krouse et al. | |
| 2004/0204074 A1 | 10/2004 | Desai | |
| 2005/0004757 A1 | 1/2005 | Neeman et al. | |
| 2005/0048961 A1 | 3/2005 | Ribaudo et al. | |
| 2005/0077870 A1 | 4/2005 | Ha et al. | |
| 2005/0159133 A1 | 7/2005 | Hasan et al. | |
| 2005/0242173 A1 | 11/2005 | Suzuki | |
| 2005/0251440 A1* | 11/2005 | Bednarek | G06Q 30/0201 705/7.32 |
| 2005/0256782 A1 | 11/2005 | Sands et al. | |
| 2005/0266798 A1 | 12/2005 | Moloney et al. | |
| 2005/0271199 A1 | 12/2005 | Collins, Jr. | |
| 2006/0089909 A1* | 4/2006 | McLeod | G06Q 20/04 705/44 |
| 2006/0093998 A1 | 5/2006 | Vertegaal | |
| 2006/0094481 A1 | 5/2006 | Gullickson | |
| 2006/0122902 A1 | 6/2006 | Petrov et al. | |
| 2006/0138219 A1 | 6/2006 | Brzezniak et al. | |
| 2006/0200378 A1 | 9/2006 | Sorensen | |
| 2006/0208066 A1 | 9/2006 | Finn et al. | |
| 2006/0223580 A1 | 10/2006 | Antonio et al. | |
| 2006/0234771 A1 | 10/2006 | Shavrov | |
| 2006/0293968 A1 | 12/2006 | Brice et al. | |
| 2007/0022375 A1 | 1/2007 | Walker | |
| 2007/0030824 A1 | 2/2007 | Ribaudo et al. | |
| 2007/0067833 A1 | 3/2007 | Colnot | |
| 2007/0072678 A1* | 3/2007 | Dagres | G07F 17/32 463/42 |
| 2007/0100651 A1 | 5/2007 | Ramer et al. | |
| 2007/0118429 A1 | 5/2007 | Subotovsky | |
| 2007/0124211 A1 | 5/2007 | Smith | |
| 2007/0138268 A1 | 6/2007 | Tuchman | |
| 2007/0150369 A1* | 6/2007 | Zivin | G06Q 30/02 705/26.64 |
| 2007/0150375 A1 | 6/2007 | Yang | |
| 2007/0150414 A1 | 6/2007 | Templeton | |
| 2007/0155430 A1 | 7/2007 | Cheon et al. | |
| 2007/0203801 A1 | 8/2007 | Istfan | |
| 2007/0214237 A1 | 9/2007 | Stibel et al. | |
| 2007/0221728 A1 | 9/2007 | Ferro et al. | |
| 2007/0244778 A1* | 10/2007 | Bailard | G06Q 40/00 705/35 |
| 2007/0244811 A1 | 10/2007 | Tumminaro | |
| 2007/0250623 A1 | 10/2007 | Hickey et al. | |
| 2007/0255653 A1 | 11/2007 | Tumminaro et al. | |
| 2007/0282700 A1* | 12/2007 | Masse | G06Q 30/02 705/26.1 |
| 2007/0299722 A1 | 12/2007 | Stoffelsma et al. | |
| 2008/0027815 A1 | 1/2008 | Johnson et al. | |
| 2008/0040219 A1 | 2/2008 | Kim et al. | |
| 2008/0040274 A1 | 2/2008 | Uzo | |
| 2008/0054072 A1 | 3/2008 | Katragadda et al. | |
| 2008/0059297 A1 | 3/2008 | Vallier et al. | |
| 2008/0059370 A1 | 3/2008 | Sada et al. | |
| 2008/0059375 A1 | 3/2008 | Abifaker | |
| 2008/0061150 A1 | 3/2008 | Phillips | |
| 2008/0080682 A1 | 4/2008 | Ogunwale et al. | |
| 2008/0084977 A1* | 4/2008 | Nayak | H04M 15/00 379/130 |
| 2008/0142599 A1 | 6/2008 | Benillouche et al. | |
| 2008/0147507 A1 | 6/2008 | Langhammer | |
| 2008/0147564 A1 | 6/2008 | Singhal | |
| 2008/0172733 A1 | 7/2008 | Coriaty et al. | |
| 2008/0177662 A1 | 7/2008 | Smith et al. | |
| 2008/0189170 A1 | 8/2008 | Ramachandra et al. | |
| 2008/0195428 A1 | 8/2008 | O'Sullivan | |
| 2008/0207296 A1 | 8/2008 | Lutnick et al. | |
| 2008/0215380 A1 | 9/2008 | Graeber | |
| 2008/0238610 A1 | 10/2008 | Rosenberg | |
| 2008/0242278 A1 | 10/2008 | Rekimoto | |
| 2008/0249865 A1 | 10/2008 | Angell et al. | |
| 2008/0249882 A1* | 10/2008 | Spolar | G06Q 30/02 705/14.14 |
| 2008/0249939 A1 | 10/2008 | Veenstra | |
| 2008/0277183 A1 | 11/2008 | Huang et al. | |
| 2008/0306678 A1 | 12/2008 | Miyawaki | |
| 2008/0319843 A1 | 12/2008 | Moser et al. | |
| 2009/0024533 A1* | 1/2009 | Fernandes | G06Q 20/10 705/75 |
| 2009/0030787 A1 | 1/2009 | Pon et al. | |
| 2009/0030885 A1* | 1/2009 | Depasquale | G06Q 10/02 |
| 2009/0043696 A1 | 2/2009 | Ornce et al. | |
| 2009/0068982 A1 | 3/2009 | Chen et al. | |
| 2009/0076896 A1 | 3/2009 | DeWitt et al. | |
| 2009/0076925 A1 | 3/2009 | DeWitt et al. | |
| 2009/0098908 A1 | 4/2009 | Silverbrook et al. | |
| 2009/0100168 A1 | 4/2009 | Harris | |
| 2009/0104920 A1 | 4/2009 | Moon et al. | |
| 2009/0117883 A1 | 5/2009 | Coffing et al. | |
| 2009/0119190 A1 | 5/2009 | Realini | |
| 2009/0125429 A1 | 5/2009 | Takayama | |
| 2009/0159681 A1 | 6/2009 | Mullen et al. | |
| 2009/0166422 A1 | 7/2009 | Biskupski | |
| 2009/0171844 A1* | 7/2009 | Olliphant | G06Q 20/102 705/44 |
| 2009/0177581 A1 | 7/2009 | Garcia et al. | |
| 2009/0187492 A1 | 7/2009 | Hammad et al. | |
| 2009/0204492 A1 | 8/2009 | Scifo et al. | |
| 2009/0210334 A1* | 8/2009 | Russell | G06Q 30/02 705/35 |
| 2009/0216676 A1 | 8/2009 | Mathur et al. | |
| 2009/0264070 A1 | 10/2009 | Lim | |
| 2009/0287408 A1 | 11/2009 | Gerdes et al. | |
| 2009/0298514 A1* | 12/2009 | Ullah | G01S 5/02 455/456.5 |
| 2009/0313138 A1 | 12/2009 | Ratnakar | |
| 2009/0313165 A1 | 12/2009 | Walter | |
| 2009/0328052 A1 | 12/2009 | Nguyen et al. | |
| 2010/0010906 A1 | 1/2010 | Grecia | |
| 2010/0057503 A1* | 3/2010 | Katz | G06Q 10/02 705/5 |
| 2010/0063889 A1 | 3/2010 | Proctor, Jr. et al. | |
| 2010/0063893 A1 | 3/2010 | Townsend | |
| 2010/0070369 A1 | 3/2010 | Fenton et al. | |
| 2010/0070378 A1 | 3/2010 | Trotman et al. | |
| 2010/0076853 A1 | 3/2010 | Schwarz | |
| 2010/0082445 A1 | 4/2010 | Hodge et al. | |

(56) References Cited

U.S. PATENT DOCUMENTS

| | | | |
|---|---|---|---|
| 2010/0082455 A1 | 4/2010 | Rosenblatt et al. | |
| 2010/0082487 A1 | 4/2010 | Nelsen | |
| 2010/0087144 A1 | 4/2010 | Korenshtein | |
| 2010/0121726 A1 | 5/2010 | Coulter et al. | |
| 2010/0125495 A1* | 5/2010 | Smith | G06Q 20/3223 705/14.23 |
| 2010/0125510 A1 | 5/2010 | Smith et al. | |
| 2010/0135178 A1 | 6/2010 | Aggarwal et al. | |
| 2010/0144375 A1 | 6/2010 | Pfister et al. | |
| 2010/0145868 A1 | 6/2010 | Niedermeyer | |
| 2010/0174596 A1 | 7/2010 | Gilman et al. | |
| 2010/0184479 A1 | 7/2010 | Griffin | |
| 2010/0191653 A1 | 7/2010 | Johnson et al. | |
| 2010/0197325 A1 | 8/2010 | Dredge | |
| 2010/0216396 A1 | 8/2010 | Fernandez et al. | |
| 2010/0243732 A1 | 9/2010 | Wallner | |
| 2010/0250410 A1 | 9/2010 | Song et al. | |
| 2010/0287250 A1 | 11/2010 | Carlson et al. | |
| 2010/0306080 A1* | 12/2010 | Trandal | G06Q 10/10 705/26.8 |
| 2010/0312385 A1 | 12/2010 | Deuber | |
| 2010/0328029 A1 | 12/2010 | Kolek | |
| 2011/0016051 A1 | 1/2011 | Trifiletti et al. | |
| 2011/0022472 A1 | 1/2011 | Zon | |
| 2011/0045840 A1 | 2/2011 | Alizadeh-Shabdiz et al. | |
| 2011/0047037 A1 | 2/2011 | Wu | |
| 2011/0059784 A1 | 3/2011 | Lutnick et al. | |
| 2011/0060600 A1 | 3/2011 | Fox et al. | |
| 2011/0063138 A1 | 3/2011 | Berkobin et al. | |
| 2011/0084131 A1 | 4/2011 | McKelvey | |
| 2011/0084139 A1 | 4/2011 | McKelvey et al. | |
| 2011/0084147 A1 | 4/2011 | Wilson et al. | |
| 2011/0090124 A1 | 4/2011 | Liu et al. | |
| 2011/0137773 A1 | 6/2011 | Davis, III et al. | |
| 2011/0137803 A1 | 6/2011 | Willins | |
| 2011/0153440 A1 | 6/2011 | Singhal | |
| 2011/0153495 A1 | 6/2011 | Dixon et al. | |
| 2011/0161235 A1 | 6/2011 | Beenau et al. | |
| 2011/0172004 A1 | 7/2011 | Breitenbach et al. | |
| 2011/0173041 A1 | 7/2011 | Breitenbach et al. | |
| 2011/0180601 A1 | 7/2011 | Morley | |
| 2011/0184837 A1 | 7/2011 | Biro | |
| 2011/0198395 A1 | 8/2011 | Chen | |
| 2011/0202393 A1 | 8/2011 | DeWakar et al. | |
| 2011/0202463 A1 | 8/2011 | Powell | |
| 2011/0208612 A1* | 8/2011 | Shader | G06Q 30/02 705/26.41 |
| 2011/0213652 A1 | 9/2011 | Gillen et al. | |
| 2011/0231292 A1 | 9/2011 | McCown | |
| 2011/0238476 A1* | 9/2011 | Carr | G06Q 30/00 705/14.25 |
| 2011/0238514 A1 | 9/2011 | Ramalingam et al. | |
| 2011/0238517 A1* | 9/2011 | Ramalingam | G06Q 20/10 705/26.1 |
| 2011/0249668 A1* | 10/2011 | Van Milligan | G06F 9/485 370/352 |
| 2011/0251892 A1 | 10/2011 | Laracey | |
| 2011/0258058 A1 | 10/2011 | Carroll et al. | |
| 2011/0258120 A1 | 10/2011 | Weiss | |
| 2011/0276418 A1 | 11/2011 | Velani | |
| 2011/0276419 A1 | 11/2011 | Johnson et al. | |
| 2011/0313867 A9 | 12/2011 | Silver | |
| 2012/0005096 A1 | 1/2012 | Dorsey et al. | |
| 2012/0008851 A1 | 1/2012 | Pennock et al. | |
| 2012/0012653 A1 | 1/2012 | Johnson et al. | |
| 2012/0052874 A1 | 3/2012 | Kumar | |
| 2012/0052910 A1 | 3/2012 | Mu et al. | |
| 2012/0072350 A1 | 3/2012 | Goldthwaite et al. | |
| 2012/0078673 A1 | 3/2012 | Koke et al. | |
| 2012/0078751 A1 | 3/2012 | MacPhail et al. | |
| 2012/0089461 A1 | 4/2012 | Greenspan | |
| 2012/0089470 A1 | 4/2012 | Barnes, Jr. | |
| 2012/0101942 A1 | 4/2012 | Park | |
| 2012/0109749 A1 | 5/2012 | Subramanian et al. | |
| 2012/0109752 A1 | 5/2012 | Strutton et al. | |
| 2012/0109781 A1* | 5/2012 | Felt | G06Q 30/0601 705/26.41 |
| 2012/0115512 A1 | 5/2012 | Grainger et al. | |
| 2012/0116861 A1 | 5/2012 | Dobyns | |
| 2012/0128089 A1 | 5/2012 | Tsutsui | |
| 2012/0130790 A1 | 5/2012 | Lyons et al. | |
| 2012/0130794 A1 | 5/2012 | Strieder | |
| 2012/0130895 A1 | 5/2012 | Granbery et al. | |
| 2012/0149390 A1 | 6/2012 | Gravely et al. | |
| 2012/0150605 A1 | 6/2012 | Isaacson et al. | |
| 2012/0150611 A1 | 6/2012 | Isaacson et al. | |
| 2012/0158500 A1* | 6/2012 | Hochstatter | G06Q 30/0255 705/14.53 |
| 2012/0166267 A1* | 6/2012 | Beatty | G06Q 30/0219 705/14.21 |
| 2012/0179516 A1 | 7/2012 | Fakhrai et al. | |
| 2012/0190386 A1 | 7/2012 | Anderson | |
| 2012/0195295 A1 | 8/2012 | Elmaleh | |
| 2012/0197724 A1 | 8/2012 | Kendall | |
| 2012/0197743 A1 | 8/2012 | Grigg et al. | |
| 2012/0209657 A1 | 8/2012 | Connolly | |
| 2012/0209685 A1 | 8/2012 | Nealer et al. | |
| 2012/0209686 A1 | 8/2012 | Horowitz et al. | |
| 2012/0209773 A1 | 8/2012 | Ranganathan | |
| 2012/0221421 A1 | 8/2012 | Hammad | |
| 2012/0232994 A1 | 9/2012 | Kim et al. | |
| 2012/0235812 A1 | 9/2012 | Maia et al. | |
| 2012/0252418 A1 | 10/2012 | Kandekar et al. | |
| 2012/0252500 A1 | 10/2012 | Mitsuya et al. | |
| 2012/0271692 A1 | 10/2012 | Huang et al. | |
| 2012/0278150 A1* | 11/2012 | Chen | G06Q 30/00 705/14.19 |
| 2012/0278172 A1 | 11/2012 | Mercuri et al. | |
| 2012/0290376 A1 | 11/2012 | Dryer et al. | |
| 2012/0290421 A1 | 11/2012 | Qawami et al. | |
| 2012/0290422 A1 | 11/2012 | Bhinder | |
| 2012/0296724 A1* | 11/2012 | Faro | G06Q 30/00 705/14.27 |
| 2012/0303425 A1* | 11/2012 | Katzin | G06Q 20/027 705/14.4 |
| 2012/0310760 A1* | 12/2012 | Phillips | G06Q 40/02 705/26.1 |
| 2012/0310824 A1 | 12/2012 | Liberty | |
| 2012/0330769 A1 | 12/2012 | Arceo | |
| 2013/0002840 A1 | 1/2013 | Toney et al. | |
| 2013/0013499 A1 | 1/2013 | Kalgi | |
| 2013/0024018 A1 | 1/2013 | Chang et al. | |
| 2013/0024364 A1 | 1/2013 | Shrivastava et al. | |
| 2013/0027227 A1* | 1/2013 | Nordstrom | G08G 1/202 340/990 |
| 2013/0030913 A1 | 1/2013 | Zhu et al. | |
| 2013/0030931 A1 | 1/2013 | Moshfeghi | |
| 2013/0030955 A1 | 1/2013 | David | |
| 2013/0036048 A1 | 2/2013 | Campos et al. | |
| 2013/0036051 A1 | 2/2013 | Giordano et al. | |
| 2013/0046589 A1 | 2/2013 | Grigg et al. | |
| 2013/0054281 A1 | 2/2013 | Thakkar et al. | |
| 2013/0054367 A1 | 2/2013 | Grigg et al. | |
| 2013/0059598 A1 | 3/2013 | Miyagi et al. | |
| 2013/0060623 A1 | 3/2013 | Walker et al. | |
| 2013/0073365 A1* | 3/2013 | McCarthy | G06Q 20/02 705/14.23 |
| 2013/0079037 A1 | 3/2013 | Dobyns | |
| 2013/0085860 A1 | 4/2013 | Summers et al. | |
| 2013/0103760 A1 | 4/2013 | Golding et al. | |
| 2013/0110658 A1 | 5/2013 | Lyman et al. | |
| 2013/0110659 A1 | 5/2013 | Phillips et al. | |
| 2013/0117155 A1 | 5/2013 | Glasgo | |
| 2013/0132140 A1 | 5/2013 | Amin et al. | |
| 2013/0132246 A1 | 5/2013 | Amin et al. | |
| 2013/0132274 A1 | 5/2013 | Henderson et al. | |
| 2013/0132887 A1 | 5/2013 | Amin et al. | |
| 2013/0138500 A1 | 5/2013 | Charaniya et al. | |
| 2013/0144674 A1 | 6/2013 | Kim et al. | |
| 2013/0144702 A1 | 6/2013 | Tabor et al. | |
| 2013/0144715 A1* | 6/2013 | Kranzley | G06Q 30/0251 705/14.49 |

(56) References Cited

U.S. PATENT DOCUMENTS

| | | |
|---|---|---|
| 2013/0151380 A1 | 6/2013 | Holt |
| 2013/0151419 A1 | 6/2013 | Hitchcock et al. |
| 2013/0157685 A1 | 6/2013 | Young |
| 2013/0159086 A1 | 6/2013 | Richard |
| 2013/0159119 A1 | 6/2013 | Henderson et al. |
| 2013/0185123 A1 | 7/2013 | Krivopaltsev et al. |
| 2013/0191195 A1* | 7/2013 | Carlson .............. G06Q 30/0261 705/14.17 |
| 2013/0191199 A1 | 7/2013 | Corner |
| 2013/0198076 A1 | 8/2013 | Zambelli Hosmer et al. |
| 2013/0217332 A1 | 8/2013 | Altman et al. |
| 2013/0217333 A1 | 8/2013 | Spragg et al. |
| 2013/0218683 A1 | 8/2013 | Hannan |
| 2013/0226800 A1 | 8/2013 | Patel et al. |
| 2013/0238540 A1 | 9/2013 | O'Donoghue et al. |
| 2013/0246207 A1 | 9/2013 | Novak et al. |
| 2013/0246301 A1 | 9/2013 | Radhakrishnan et al. |
| 2013/0248596 A1 | 9/2013 | Arora et al. |
| 2013/0268378 A1 | 10/2013 | Yovin |
| 2013/0282438 A1 | 10/2013 | Hunter et al. |
| 2013/0282490 A1 | 10/2013 | Kramer et al. |
| 2013/0297422 A1 | 11/2013 | Hunter et al. |
| 2013/0304898 A1 | 11/2013 | Aggarwal et al. |
| 2014/0012689 A1 | 1/2014 | Henderson et al. |
| 2014/0012757 A1 | 1/2014 | Henderson et al. |
| 2014/0028440 A1 | 1/2014 | Takeuchi et al. |
| 2014/0052615 A1 | 2/2014 | Andersen |
| 2014/0068719 A1 | 3/2014 | Kiukkonen et al. |
| 2014/0074743 A1 | 3/2014 | Rademaker |
| 2014/0108173 A1 | 4/2014 | Cooper et al. |
| 2014/0108177 A1 | 4/2014 | Erke et al. |
| 2014/0123043 A1 | 5/2014 | Schmidt et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0149282 A1 | 5/2014 | Philliou et al. |
| 2014/0156531 A1 | 6/2014 | Poon et al. |
| 2014/0179340 A1 | 6/2014 | Do et al. |
| 2014/0187257 A1 | 7/2014 | Emadzadeh et al. |
| 2014/0257877 A1 | 9/2014 | L'Heureux et al. |
| 2014/0263630 A1 | 9/2014 | Richardson et al. |
| 2014/0278609 A1 | 9/2014 | Capps |
| 2014/0310182 A1 | 10/2014 | Cummins |
| 2014/0359510 A1 | 12/2014 | Graf et al. |
| 2014/0370879 A1 | 12/2014 | Redding et al. |
| 2014/0379582 A1 | 12/2014 | Caglayan et al. |
| 2015/0031388 A1 | 1/2015 | Chatterjee et al. |
| 2015/0031393 A1 | 1/2015 | Post et al. |
| 2015/0046339 A1 | 2/2015 | Wong et al. |
| 2015/0079942 A1 | 3/2015 | Kostka et al. |
| 2015/0081532 A1 | 3/2015 | Lewis et al. |
| 2015/0120509 A1 | 4/2015 | Moring et al. |
| 2015/0126119 A1 | 5/2015 | Schulz et al. |
| 2015/0178698 A1 | 6/2015 | Schulz et al. |
| 2015/0339648 A1 | 11/2015 | Kushevsky et al. |
| 2016/0019531 A1 | 1/2016 | Gormley |
| 2016/0259616 A1 | 9/2016 | Hosein et al. |
| 2017/0124567 A1 | 5/2017 | Henderson et al. |
| 2017/0270573 A1 | 9/2017 | Kim et al. |
| 2018/0227712 A1 | 8/2018 | Post et al. |

FOREIGN PATENT DOCUMENTS

| | | |
|---|---|---|
| CA | 2 919 238 A1 | 1/2015 |
| DE | 20 2012 100 620 U1 | 6/2012 |
| EP | 2 506 642 A1 | 10/2012 |
| JP | 2004-078662 A | 3/2004 |
| JP | 2005-269172 A | 9/2005 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 2010/097711 A2 | 9/2010 |
| WO | 2010/135174 A1 | 11/2010 |
| WO | 2013/009891 A1 | 1/2013 |
| WO | 2015/013170 A1 | 1/2015 |
| WO | 2015/066056 A1 | 5/2015 |

OTHER PUBLICATIONS

Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.

Justin, "Visa Enters the Location-Based Mobile Marketing Space With New iPhone App," dated Dec. 14, 2010, Retrieved from the Internet URL: http://www.mobilemarketingwatch.com/visa-enters-the-location-based-mobile-marketing-space-with-new-iphone-app-11875/, on Feb. 23, 2015, p. 1.

Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.

"Uber—Android Apps on Google Play," dated Nov. 10, 2014, Retrieved from the internet URL: https://play.google.com/store/apps/details?id=com.ubercab&hl=en, on Nov. 12, 2014, pp. 2.

Non-Final Office Action dated Oct. 25, 2013, for U.S. Appl. No. 13/683,841, of Henderson, W., et al., filed Nov. 21, 2012.

Non-Final Office Action dated May 29, 2014, for U.S. Appl. No. 14/017,247, of Henderson, W., et al., filed Sep. 3, 2013.

Non-Final Office Action dated Jan. 7, 2015, for U.S. Appl. No. 14/017,940, of Henderson, W., et al., filed Sep. 4, 2013.

Non-Final Office Action dated Jan. 9, 2015, for U.S. Appl. No. 14/498,975, of Varma, A.K., et al., filed Sep. 26, 2014.

Non-Final Office Action dated Mar. 17, 2015, for U.S. Appl. No. 13/683,879, of Henderson, W., et al., filed Nov. 21, 2012.

Advisory Action dated May 4, 2015, for U.S. Appl. No. 13/627,615, of Henderson, W., et al., filed Sep. 26, 2012.

Non-Final Office Action dated May 29, 2015, for U.S. Appl. No. 13/627,602, of Henderson, W., et al., filed Sep. 26, 2012.

Final Office Action dated Jul. 8, 2015, for U.S. Appl. No. 14/498,975, of Varma, A.K., et al., filed Sep. 26, 2014.

Non-Final Office Action dated Aug. 12, 2015, for U.S. Appl. No. 13/627,615, of Henderson, W., et al., filed Sep. 26, 2012.

Non-Final Office Action dated Aug. 26, 2015, for U.S. Appl. No. 14/017,247, of Henderson, W., et al., filed Sep. 3, 2013.

Non-Final Office Action dated Aug. 27, 2015, for U.S. Appl. No. 14/017,940, of Henderson, W., et al., filed Sep. 4, 2013.

Final Office Action dated Nov. 5, 2015, for U.S. Appl. No. 13/683,879, of Henderson, W., et al., filed Nov. 21, 2012.

Final Office Action dated Dec. 4, 2015, for U.S. Appl. No. 13/627,602, of Henderson, W., et al., filed Sep. 26, 2012.

Final Office Action dated Feb. 12, 2016, for U.S. Appl. No. 14/017,940, of Henderson, W., et al., filed Sep. 4, 2013.

Notice of Allowance dated Mar. 1, 2016, for U.S. Appl. No. 13/627,615, of Henderson, W., et al., filed Sep. 26, 2012.

Non-Final Office Action dated Apr. 22, 2016, for U.S. Appl. No. 13/683,879, of Henderson, W., et al., filed Nov. 21, 2012.

Non-Final Office Action dated Apr. 22, 2016, for U.S. Appl. No. 13/683,841, of Henderson, W., et al., filed Nov. 21, 2012.

Non-Final Office Action dated Apr. 22, 2016, for U.S. Appl. No. 14/498,975, of Varma, A.K., et al., filed Sep. 26, 2014.

Final Office Action dated Apr. 27, 2016, for U.S. Appl. No. 14/017,247, of Henderson, W., et al., filed Sep. 3, 2013.

International Search Report and Written Opinion for International Application No. PCT/US2014/062697, dated Feb. 10, 2015.

Non-Final Office Action dated Aug. 29, 2016, for U.S. Appl. No. 13/627,602, of Henderson, W., et al., filed Sep. 26, 2012.

Notice of Allowance dated Oct. 7, 2016, for U.S. Appl. No. 14/017,940, of Henderson, W., et al., filed Sep. 4, 2013.

Notice of Allowance dated Oct. 24, 2016, for U.S. Appl. No. 13/683,879, of Henderson, W., et al., filed Nov. 21, 2012.

Final Office Action dated Oct. 31, 2016, for U.S. Appl. No. 14/498,975, of Varma, A.K., et al., filed Sep. 26, 2014.

Final Office Action dated Nov. 3, 2016, for U.S. Appl. No. 13/683,841, of Henderson, W., et al., filed Nov. 21, 2012.

(56) References Cited

OTHER PUBLICATIONS

Notice of Allowance dated Nov. 30, 2016, for U.S. Appl. No. 14/017,940, of Henderson, W., et al., filed Sep. 4, 2013.
Notice of Allowance dated Dec. 27, 2016, for U.S. Appl. No. 14/017,247, of Henderson, W., et al., filed Sep. 3, 2013.
Non-Final Office Action dated Feb. 23, 2017, for U.S. Appl. No. 14/311,176, of Moring, M.D., et al., filed Jun. 20, 2014.
Advisory Action dated Aug. 5, 2016, for U.S. Appl. No. 14/017,247, of Henderson, W., et al., filed Sep. 3, 2013.
Notice of Allowance dated Jun. 20, 2017, for U.S. Appl. No. 14/498,975, of Varma, A.K., et al., filed Sep. 26, 2014.
Non-Final Office Action dated Jul. 10, 2017, for U.S. Appl. No. 14/498,876, of Varma, A.K., et al., filed Sep. 26, 2014.
Non-Final Office Action dated Jul. 13, 2017, for U.S. Appl. No. 14/498,912, of Varma, A.K., et al., filed Sep. 26, 2014.
Notice of Allowance dated Apr. 12, 2017, for U.S. Appl. No. 13/627,602, of Henderson, W., et al., filed Sep. 26, 2012.
Non-Final Office Action dated May 1, 2017, for U.S. Appl. No. 14/498,922, of Varma, A.K., et al., filed Sep. 26, 2014.
Examiner Requisition for Canadian Patent Application No. 2,777,885, dated Apr. 5, 2017.
Non-Final Office Action dated Nov. 2, 2017, for U.S. Appl. No. 14/453,526, of Jowdy, J. M., filed Aug. 6, 2014.
Final Office Action dated Nov. 22, 2017, for U.S. Appl. No. 14/498,912, of Varma, A.K., et al., filed Sep. 26, 2014.
Notice of Allowance dated Dec. 11, 2017, for U.S. Appl. No. 14/498,876, of Varma, A.K., et al., filed Sep. 26, 2014.
Non-Final Office Action dated Dec. 15, 2017, for U.S. Appl. No. 14/498,922, of Varma, A. K., et al., filed Sep. 26, 2014.
Advisory Action dated Jan. 30, 2018, for U.S. Appl. No. 14/498,912, of Varma, A.K., et al., filed Sep. 26, 2014.
Non-Final Office Action dated Feb. 13, 2018, U.S. Appl. No. 14/311,176, of Moring, M.D., et al., filed Jun. 20, 2014.
Final Office Action dated Aug. 10, 2017, for U.S. Appl. No. 14/311,176, of Moring, D., et al., filed Jun. 20, 2014.
Non-Final Office Action dated Aug. 11, 2017, for U.S. Appl. No. 13/683,841, of Henderson, W., et al., filed Nov. 21, 2012.
Final Office Action dated Aug. 16, 2017, for U.S. Appl. No. 14/498,922, of Varma, A. K., et al., filed Sep. 26, 2014.
Burke, R.R., "The Third Wave of Marketing Intelligence," Retailing in the 21st Century: Current and Future Trends, pp. 103-115 (2010).
Chediak, M., "Retail technology; Grocers get taste of future; Store owners who want to stand out in the crowd these days are embracing cutting-edge services," The Orlando Sentinel, pp. 1-2 (Jan. 21, 2006).
Shekar, S., et al., "iGrocer—A Ubiquitous and Pervasive Smart Grocery Shopping System," Proceedings of the 2003 ACM Symposium on Applied Computing, pp. 645-652 (Mar. 9, 2003).
Non-Final Office Action dated Jun. 25, 2018, for U.S. Appl. No. 14/042,366, of Brock, Z., et al., filed Sep. 30, 2013.
Non-Final Office Action dated Aug. 6, 2018, for U.S. Appl. No. 14/065,760, of Henderson, W., et al., filed Oct. 29, 2013.
Notice of Allowance dated Aug. 8, 2018, for U.S. Appl. No. 14/079,320, of Chatterjee, S., et al., filed Nov. 13, 2013.
Non-Final Office Action dated Aug. 7, 2009, for U.S. Appl. No. 12/050,752, of Niedermeyer, B.J., filed Mar. 18, 2008.
Notice of Allowance dated Dec. 16, 2009, for U.S. Appl. No. 12/050,752, of Niedermeyer, B.J., filed Mar. 18, 2008.
Non-Final Office Action dated Sep. 10, 2010, for U.S. Appl. No. 12/707,228, of Niedermeyer, B.J., filed Feb. 17, 2010.
Final Office Action dated Mar. 31, 2011, for U.S. Appl. No. 12/707,228, of Niedermeyer, B.J., filed Feb. 17, 2010.
Non-Final Office Action dated Oct. 10, 2012, for U.S. Appl. No. 13/179,832, of Dorsey, J., et al., filed Jul. 11, 2011.
Final Office Action dated Jun. 27, 2013, for U.S. Appl. No. 13/179,832, of Dorsey, J., et al., filed Jul. 11, 2011.
Advisory Action dated Oct. 24, 2013, for U.S. Appl. No. 13/179,832, of Dorsey, J., et al., filed Jul. 11, 2011.
Non-Final Office Action dated Jan. 8, 2014, for U.S. Appl. No. 13/179,832, of Dorsey, J., et al., filed Jul. 11, 2011.
Non Final Office Action dated Dec. 1, 2014, for U.S. Appl. No. 13/802,064, of Lee, B., filed Mar. 13, 2013.
Notice of Allowance dated Feb. 6, 2015, for U.S. Appl. No. 13/802,290, of Lee, B., filed Mar. 13, 2013.
Final Office Action dated Mar. 20, 2015, for U.S. Appl. No. 13/802,064, of Lee, B., filed Mar. 13, 2013.
Notice of Allowance dated Apr. 13, 2015, for U.S. Appl. No. 13/801,340, of Lee, B., filed Mar. 13, 2013.
Non Final Office Action dated Oct. 1, 2015, for U.S. Appl. No. 14/803,850, of Lee, B., filed Jul. 20, 2015.
Notice of Allowance dated Oct. 13, 2015, for U.S. Appl. No. 13/802,064, of Lee, B., filed Mar. 13, 2013.
Non-Final Office action dated Oct. 19, 2015, for U.S. Appl. No. 13/948,871, of Post, J.D., et al., filed Jul. 23, 2013.
Non Final Office Action dated Jan. 13, 2016, for U.S. Appl. No. 14/726,165, of Lee, B., filed May 29, 2015.
Non-Final Office Action dated Mar. 10, 2016, for U.S. Appl. No. 14/065,760, of Henderson, W., et al., filed Oct. 29, 2013.
Notice of Allowance dated May 12, 2016, for U.S. Appl. No. 14/726,165, of Lee, B., filed May 29, 2015.
Final Office action dated May 17, 2016, for U.S. Appl. No. 13/948,871, of Post, J.D., et al., filed Jul. 23, 2013.
Final Office Action dated Jul. 6, 2016, for U.S. Appl. No. 14/065,760, of Henderson, W., et al., filed Oct. 29, 2013.
Final Office Action dated Jul. 22, 2016, for U.S. Appl. No. 14/803,850, of Lee, B., filed Jul. 20, 2015.
Non-Final Office Action dated Jul. 29, 2016, for U.S. Appl. No. 14/079,320, of Chatterjee, S., et al., filed Nov. 13, 2013.
Examination Report No. 1 for Australian Patent Application No. 2014293388, dated Aug. 2, 2016.
Advisory Action dated Sep. 1, 2016, for U.S. Appl. No. 13/948,871, of Post, J.D., et al., filed Jul. 23, 2013.
Non-Final Office Action dated Sep. 28, 2016, for U.S. Appl. No. 14/042,366, of Brock, Z., et al., filed Sep. 30, 2013.
Non-Final Office action dated Dec. 16, 2016, for U.S. Appl. No. 13/948,871, of Post, J.D., et al., filed Jul. 23, 2013.
Examiner Requisition for Canadian Patent Application No. 2,919,238, dated Feb. 6, 2017.
Non Final Office Action dated Mar. 1, 2017, for U.S. Appl. No. 14/941,020, of Lee, B., filed Nov. 13, 2015.
Non-Final Office Action dated Apr. 4, 2017, for U.S. Appl. No. 15/269,865, of Lee, B., filed Sep. 19, 2016.
Non-Final Office Action dated Apr. 6, 2017, for U.S. Appl. No. 14/065,760, of Henderson, W., et al., filed Oct. 29, 2013.
Notice of Allowance dated Apr. 7, 2017, for U.S. Appl. No. 14/803,850, of Lee, B., filed Jul. 20, 2015.
Final Office Action dated Apr. 11, 2017, for U.S. Appl. No. 14/079,320, of Chatterjee, S., et al., filed Nov. 13, 2013.
Advisory Action dated Jul. 20, 2017, for U.S. Appl. No. 14/079,320, of Chatterjee, S., et al., filed Nov. 13, 2013.
Final Office action dated Jul. 20, 2017, for U.S. Appl. No. 13/948,871, of Post, J.D., et al., filed Jul. 23, 2013.
Notice of Allowance dated Jul. 25, 2017, for U.S. Appl. No. 15/269,865, of Lee, B., filed Sep. 19, 2016.
Final Office Action dated Sep. 27, 2017, for U.S. Appl. No. 14/941,020, of Lee, B., filed Nov. 13, 2015.
Advisory Action dated Oct. 5, 2017, for U.S. Appl. No. 13/948,871, of Post, J.D., et al., filed Jul. 23, 2013.
Non-Final Office Action dated Oct. 6, 2017, for U.S. Appl. No. 14/079,320, of Chatterjee, S., et al., filed Nov. 13, 2013.
Final Office Action dated Nov. 1, 2017, for U.S. Appl. No. 14/065,760, of Henderson, W., et al., filed Oct. 29, 2013.
Notice of Allowance dated Nov. 6, 2017, for U.S. Appl. No. 13/948,871, of Post, J.D., et al., filed Jul. 23, 2013.
Advisory Action dated Jan. 4, 2018, for U.S. Appl. No. 14/941,020, of Lee, B., filed Nov. 13, 2015.
Final Office Action dated Jan. 8, 2018, for U.S. Appl. No. 14/042,366, of Brock, Z., et al., filed Sep. 30, 2013.
Examiner Requisition for Canadian Patent Application No. 2,919,238, dated Feb. 9, 2018.
Final Office Action dated Feb. 22, 2018, for U.S. Appl. No. 14/079,320, of Chatterjee, S., et al., filed Nov. 13, 2013.

(56) References Cited

OTHER PUBLICATIONS

Examination Report No. 1 for Australian Patent Application No. 2017208387, dated Feb. 26, 2018.
Advisory Action dated Feb. 28, 2018, for U.S. Appl. No. 14/065,760, of Henderson, W., et al., filed Oct. 29, 2013.
Non-Final Office Action dated Mar. 22, 2018, for U.S. Appl. No. 14/941,020, of Lee, B., filed Nov. 13, 2015.
Advisory Action dated May 15, 2018, for U.S. Appl. No. 14/042,366, of Brock, Z., et al., filed Sep. 30, 2013.
International Search Report and Written Opinion for International Application No. PCT/US2012/046282, dated Oct. 4, 2012.
International Search Report and Written Opinion for International Application No. PCT/US2014/047381 dated Nov. 25, 2014.
Advisory Action dated Jun. 17, 2019, for U.S. Appl. No. 15/909,005, of Post, D.J., et al., filed Jan. 3, 2018.
"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
"Arduino magnetic stripe decoder," Instructables, Retrieved from the Internet URL: http://www.instructables.com/id/Arduino-magneticstripe-decorder/, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Headphone Jack (3.5mm)," Retrieved from the Internet URL: http://www.phonescoop.com/glossary/term.php?gid=440, on May 5, 2011, pp. 1-1.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers the hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," Tyner, Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44/2008, The American Society of Mechanical Engineers, Nov. 21, 2008, pp. 1-31.

"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Bourdeauducq, S., "Reading magnetic cards (almost) for free" ("Lekemel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Finzgar et. al., "Use of NFC and QR code identification in an electronic ticket system for public transport," Published in SoftCOM 2011, 19th International Conference on Software, Telecommunications and Computer networks, Jan. 11, 2011, pp. 1-6.
Goode, L., "Paying With Square's New Mobile-Payments App," All Things D., published on Apr. 30, 2012, Retrieved from the Internet URL: http://allthingsd.com/20120430/paying-with-squares-new-mobile-payments-app/, on Nov. 7, 2014, pp. 1-3.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.

(56) References Cited

OTHER PUBLICATIONS

Website: www.alexwinston.com, Aug. 31, 2009, pp. 1-5.
Final Office Action dated Oct. 30, 2018, for U.S. Appl. No. 14/941,020, of Lee, B., filed Nov. 13, 2015.
Examination Report No. 2 for Australian Patent Application No. 2017208387, dated Nov. 9, 2018.
Non-Final Office Action dated Dec. 13, 2018, for U.S. Appl. No. 15/909,005, of Post, J.D., et al., filed Mar. 1, 2018.
Examiner Requisition for Canadian Patent Application No. 2,919,238, dated Dec. 20, 2018.
Non-Final Office Action dated Dec. 31, 2018, for U.S. Appl. No. 15/445,380, of Brock, Z., filed Feb. 28, 2017.
Notice of Allowance dated Feb. 4, 2019, for U.S. Appl. No. 14/042,366, of Brock, Z., filed Sep. 30, 2013.
Advisory Action dated Feburary 8, 2019, for U.S. Appl. No. 14/941,020, of Lee, B., filed Nov. 13, 2015.
Examination Report No. 3 for Australian Patent Application No. 2017208387, dated Feb. 11, 2019.
Notice of Allowance dated Mar. 15, 2019, for U.S. Appl. No. 14/941,020 of Lee, B., filed Nov. 13, 2015.
Advisory Action dated Mar. 29, 2019, for U.S. Appl. No. 15/084,390, of Henderson, W., et al., filed Mar. 29, 2016.
Final Office Action dated Apr. 4, 2019, for U.S. Appl. No. 15/909,005, of Post, J.D., et al., filed Jan. 3, 2018.
Final Office Action dated Apr. 4, 2019, for U.S. Appl. No. 14/065,760, of Henderson, W., et al., filed Oct. 29, 2013.
Advisory Action dated Jul. 8, 2019, for U.S. Appl. No. 14/065,760, of Henderson, W., et al., filed Oct. 29, 2013.
Final Office Action dated Jul. 8, 2019, for U.S. Appl. No. 15/445,380, of Brock, Z., filed Feb. 28, 2017.
Notice of Allowance dated Sep. 25, 2019, for U.S. Appl. No. 15/909,005, of Post, D. J., et al., filed Jan. 3, 2018.
Advisory Action dated Sep. 26, 2019, for U.S. Appl. No. 15/445,380, of Brock, Z., filed Feb. 28, 2017.
Examiner Requisition for Canadian Patent Application No. 2,919,238, dated Nov. 5, 2019.
Examination report for Australian Patent Application No. 2019201310, dated Nov. 25, 2019.
Non-Final Office Action dated Oct. 31, 2019, for U.S. Appl. No. 15/445,380, of Brock, Z., filed Feb. 28, 2017.
Final Office Action dated Apr. 17, 2020, for U.S. Appl. No. 15/445,380, of Brock, Z., filed Feb. 28, 2017.
Advisory Action dated Jul. 2, 2020, for U.S. Appl. No. 15/445,380, of Brock, Z., filed Feb. 28, 2017.

\* cited by examiner

CARDLESS PAYMENT TRANSACTIONS BASED ON GEOGRAPHIC LOCATIONS OF USER DEVICES

CROSS-REFERENCE TO RELATED APPLICATIONS

This application is a continuation of and claims priority to U.S. patent application Ser. No. 13/627,615 filed on Sep. 26, 2012 entitled "Ranking of Merchants for Cardless Payment Transactions," which claims priority to U.S. patent application Ser. No. 61/612,128, entitled "Ranking of Merchants for Cardless Payment Transactions," filed Mar. 16, 2012, which are both incorporated herein by reference in their entirety.

TECHNICAL FIELD

This disclosure relates to ranking of merchants for cardless payment transactions.

BACKGROUND

When searching for merchants, a user can enter a search query into a search engine. The search query can include a merchant's name or a name of a desired product or service. The user can limit the search by location. The search engine can return results to the user in response to the search query and any limitations provided by the user. To perform a transaction (e.g., a purchase) with a merchant in the search results, the user must visit the merchant's retail store or the merchant's online shopping portal.

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

SUMMARY

This specification relates to listing merchants that allow cardless payment transactions. A convenient graphical user interface that lists merchants that allow cardless payment transactions can be displayed on the user's mobile device. The ranking of merchants within the list can be based on a variety of indicators, other than simply distance from the user to the merchant. Merchants can be recommended to a customer based on previous transactions, length of time spent by customer in different locations, and other indicators.

After selecting a merchant, the user can choose to conduct a transaction with the merchant. On the one hand, it would be generally convenient for a customer to dispense with swiping of a credit card. On the other hand, the risk of unauthorized transactions is a potential problem in a cardless payment transaction. An approach for conducting an electronic payment transaction without swiping a card is for the customer to provide authorization that particular merchants can perform a cardless payment transaction, and for such transactions to only be authorized when the customer is within a predetermined distance of the merchant, e.g., as sensed by the customer's mobile device.

In one aspect, a method includes obtaining a current location of a mobile device of a customer; sending the current location to a cardless payment system; receiving data identifying a plurality of merchants, each merchant having an account with the cardless payment system; displaying a list of the plurality of merchants on the mobile device; and simultaneous with displaying the list of the plurality of merchants, for each merchant in the list displaying on the mobile device whether the merchant is authorized to perform a cardless payment transaction with the customer.

Implementations may include one or more of the following features. Displaying the plurality of merchants further comprises, for each merchant, displaying at least one of a name of the merchant or an icon representing the merchant. Displaying the plurality of merchants further comprises, for each merchant, displaying the name of the merchant and an icon representing the merchant. The list comprises a plurality of rows, each row including a name of a single merchant and an icon representing whether the merchant is authorized to perform the cardless payment transaction with the customer. Determining whether the customer is within a predetermined distance of the merchant. The mobile device is not within the predetermined distance, displaying whether the merchant is authorized comprises displaying a first symbol (410). Determining a distance from the user device to the merchant, and the first symbol represents the distance. Determining whether an indication of consent has been received from the customer to perform cardless payment transactions with the merchant. Determining that no indication of consent has been received by the mobile device and displaying a second symbol (414). Changing the first symbol to a second symbol (414) when the user passes to within the predetermined distance. Receiving the indication of consent from the customer by receiving a touch on the second symbol. Changing the second symbol to a third symbol (420) upon receiving an indication that the merchant is authorized to perform a cardless payment transaction with the customer. Receiving the indication of consent from the customer, sending the indication of consent to the cardless payment system, and receiving the indication that the merchant is authorized from the cardless payment system. Determining that an indication of consent has been received from the customer and that the user is not within the predetermined distance and displaying a fourth symbol (418). Determining that an indication of consent has been received by the mobile device and that the user is within the predetermined distance, and changing the first symbol to a third symbol (420).

In one aspect, a method of ranking merchants includes receiving in a cardless payment system a current location of a mobile device of a customer; receiving data identifying a plurality of merchants based on proximity to the current location, each merchant having an account with the cardless payment system; ranking the plurality of merchants based on at least one or more indicators, the one or more indicators including purchase data; and sending the ranking of the plurality of merchants to the mobile device.

Implementations may include one or more of the following features. The purchase data includes itemized description of previously purchased items from one or more merchants in the plurality of merchants. The itemized descriptions include at least a name, stock keeping unit (SKU) or universal product code (UPC) for each item. The purchase data includes itemized description of previously purchased items purchased by the customer. Receiving consent from the user to determine the ranking based on the purchase data. The purchase data includes itemized description of previously purchased items purchased by users other than the customer. The purchase data includes times, or quantities of one or more previously purchased items. The one or more indicators include at least one of the following: a distance from the current location, a time, a date, one or more favorite merchants selected by the customer, or dwell time of the mobile device, the dwell time tracking how long the mobile device is located within a predetermined distance from the merchant. Sending the ranking of the plurality of merchants is performed prior to receiving any search or filter term from the mobile device. The one or more indicators include merchant interests of other customers, the merchant interests including purchase data of the other customers, and where the other customers are associated with the customer.

In one aspect, a method of ranking merchants includes receiving in a cardless payment system a current location of a mobile device of a customer; receiving data identifying a plurality of merchants based on proximity to the current location, each merchant having an account with the cardless payment system; ranking the plurality of merchants based on at least one or more indicators, the one or more indicators including a dwell time, the dwell time tracking how long the mobile device is located within a predetermined distance from a geographic location; sending the ranking of the plurality of merchants to the mobile device.

Implementations may include one or more of the following features. The geographic location comprises a location of the merchant. Receiving consent from the user to determine the ranking based on the dwell time. Receiving tracking data tracking a position of the mobile device over time and calculating the dwell time from the tracking data. The one or more indicators include at least one of the following: a distance from the current location, a time, a date, one or more favorite merchants selected by the customer, or purchase data. sending the ranking of the plurality of merchants is performed prior to receiving any search or filter term from the mobile device.

Advantages may include one or more of the following. A customer can be provided with a list of merchants that are relevant to the customer based on the customer's location. The list can be displayed on a graphical user interface that conveniently shows whether the user has "checked in" with a merchant, i.e., whether customer has authorized cardless payments with the merchant and the customer is within the predetermined distance. Merchants can be ranked in the list based on the customer's dwell times or previous purchases at each merchant's location. A customer can conduct a point-of-sale electronic payment transaction with a merchant without swiping a card. In addition, the customer can verbally notify the merchant to perform a transaction, and the customer can conduct the transaction without having to access his or her own wallet or mobile phone. In addition, in some implementations the customer need not interact with a point-of-sale device, e.g., need not press an approve button on a user interface of the point-of-sale device or electronically sign. Consent to a cardless payment transaction can be given by the customer before the customer physically arrives at the merchant or at the merchant's point-of-sale device.

BRIEF DESCRIPTION OF THE DRAWINGS

Like reference numbers and designations in the various drawings indicate like elements.

DETAILED DESCRIPTION

As an overview, the system allows a user to conduct cardless payment transactions. The system provides the user with a list of merchants that can process cardless payments. The list of merchants can be ranked based on one or more indicators as described further below in FIGS. 8 and 9. The system also allows a user (also called a customer or payer) to purchase items from a merchant while physically present at the merchant, e.g., at the point of sale, but using a cardless payment transaction. A cardless payment transaction is one where a user conducts the transaction with a merchant at a point of sale using a financial account without physically presenting a payment card to the merchant at the point of sale. In fact, the merchant need not receive any details about the financial account, e.g., the credit card issuer, credit card number, and the like is not provided to the merchant.

From the user's perspective, the user first signs up for an account with the cardless payment system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the cardless payment system. The user can give consent to perform a cardless payment transaction with the merchant if the user is within a predetermined distance from the merchant. After the user gives consent, the merchant can, without a presentment of the physical payment card, charge (in the case of credit cards) or debit (in the case of debit cards) the user's financial account for items the user wants to buy. Because the user's payment card is already on file with the cardless payment system, the user does not need to physically present a credit card to the merchant.

Figure 1:
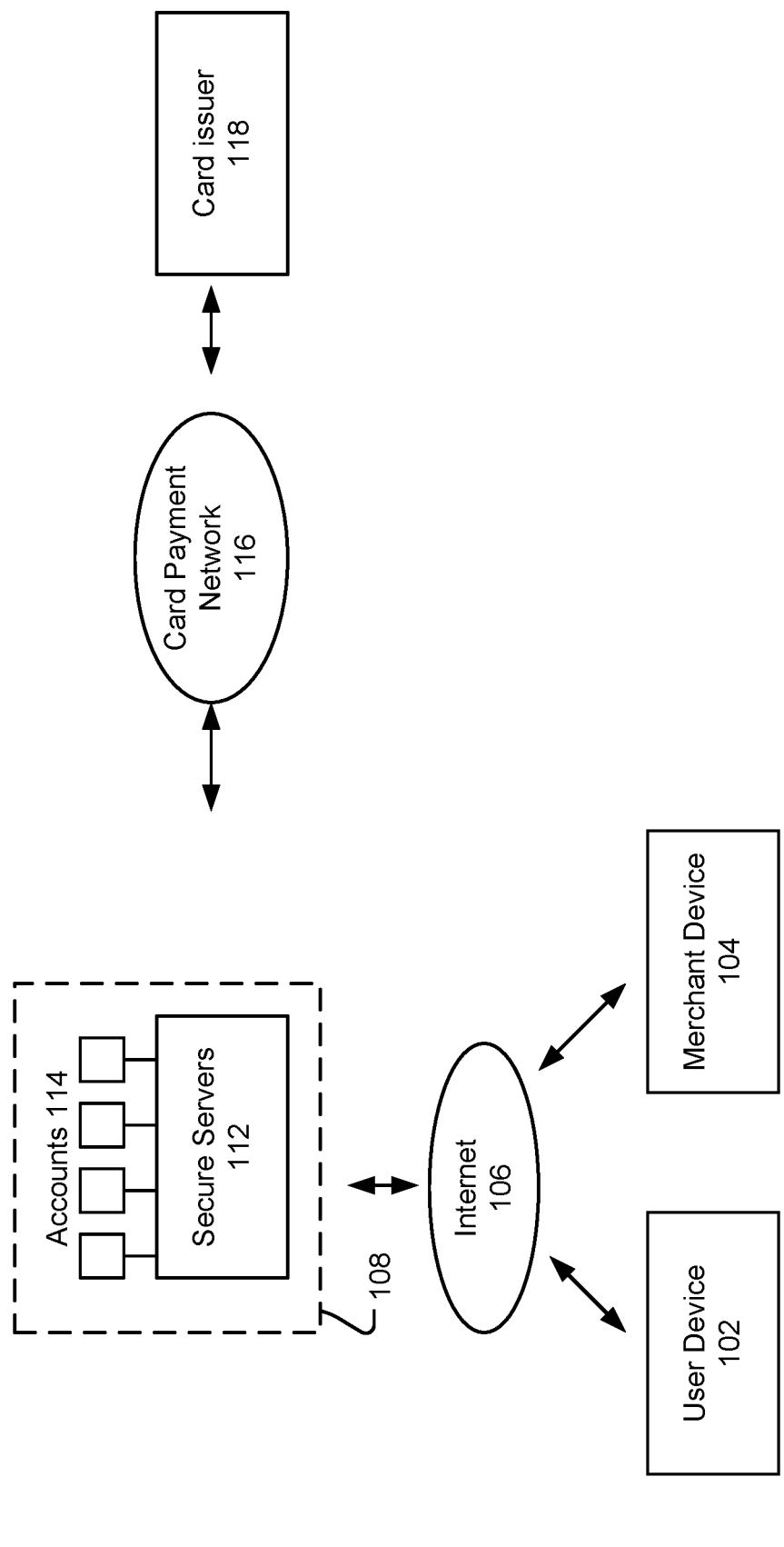
FIG. 1 is a schematic illustration of an example cardless payment system architecture.

FIG. 1 is a schematic illustration of the architecture of an example cardless payment system 100. The overall system 100 includes a user device 102 and merchant device 104 connected to a network, e.g., the Internet 106. The user device 102 is a mobile computing device, i.e., a hand-held computing device, capable of running a user application. For example, the user device 102 can be a smartphone or tablet computer. The merchant device 104 is also a computing device, capable of running a merchant application. The merchant device 104 can be a mobile device, or it can be a desktop computer, a laptop computer, a dedicated point of sale system, or other data processing apparatus.

A cardless payment processor operates a payment service system 108. The user and merchant devices can communicate with the payment service system 108 using the network 106. The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed using the cardless payment system, the user must create a user account with the payment service system 108 and the merchant must create a merchant account with the payment service system 108.

The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user would be provided to the merchant so that the merchant can compare the photo to the person. In addition, the payment service system 108 can require a personal identification number (PIN) be entered by the user. Other requirements can also be added to increase security. The data associated with a user account 114 can be stored at the servers 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile device 102, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
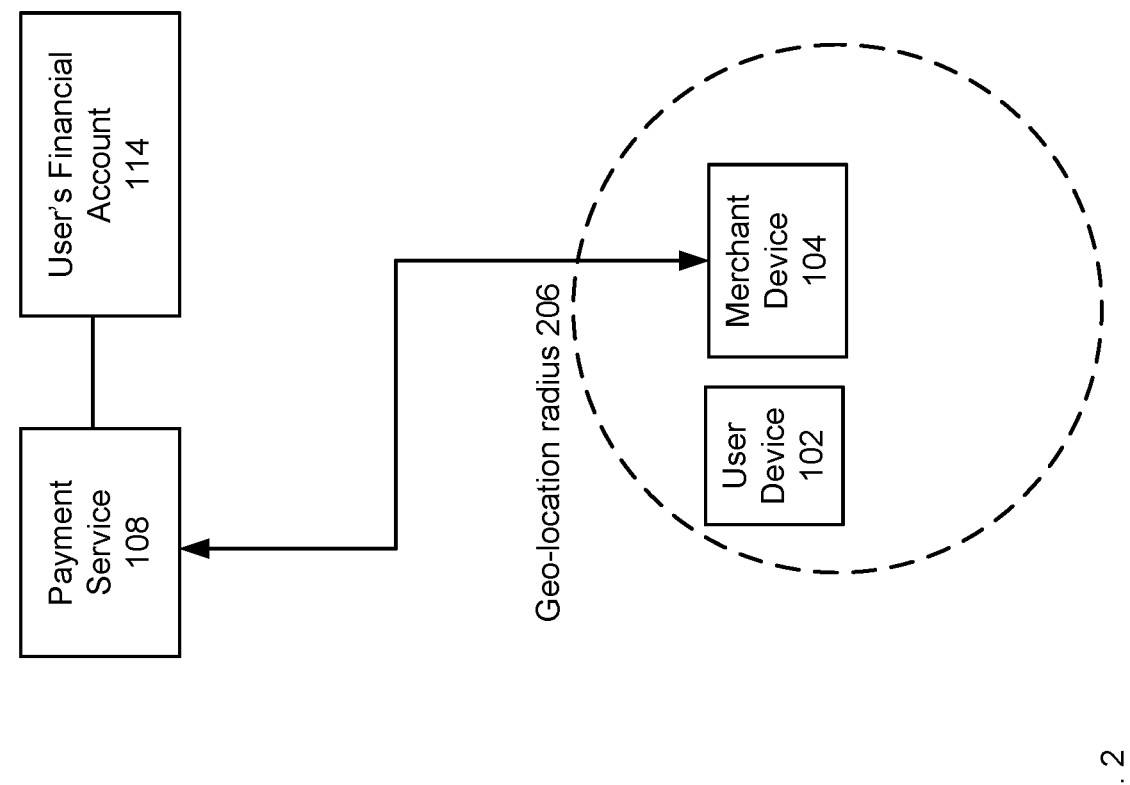
FIG. 2 is a diagram of an example implementation of the cardless payment system.
Figure 2:
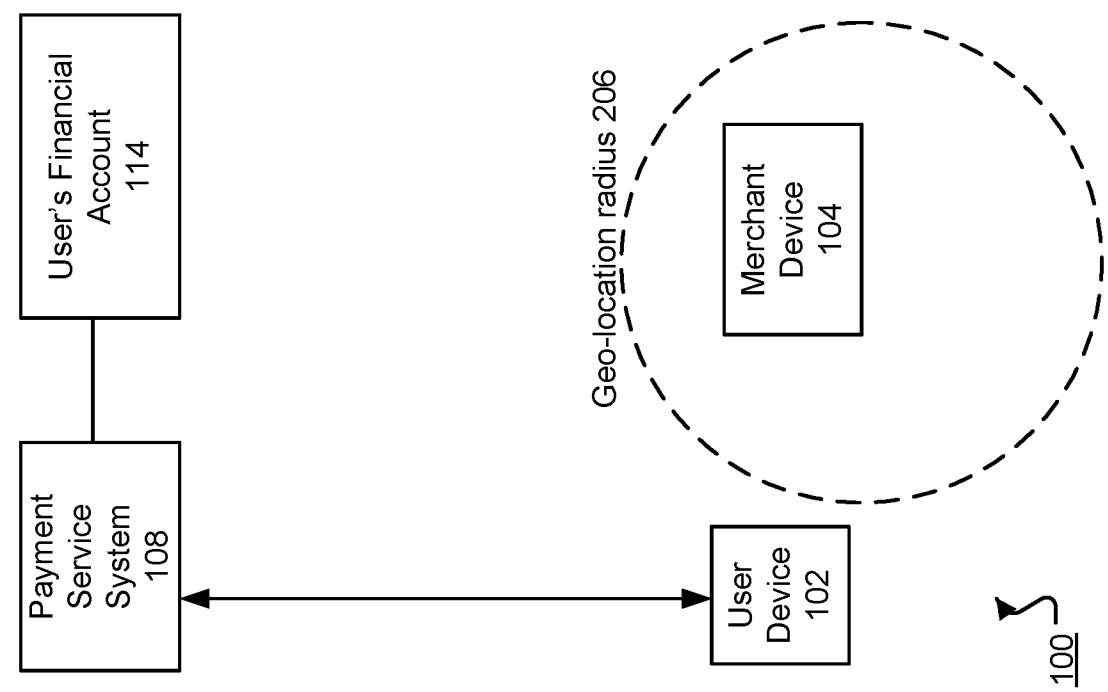

FIG. 2 is a diagram that outlines an example implementation of the cardless payment system 100. A user carries a mobile device 102 with the user application installed, and a merchant has a device 104 with the merchant application installed. Users and merchants each have an association, e.g., an account, with the payment service system 108.

The system can predetermine a geo-location distance 206, e.g., a radius, around the location of the merchant. In some implementations, the geo-location distance 206 is 500 feet. In some implementations, the geo-location distance 206 can be set by the merchant, e.g., the payment service system 108 receives input from the merchant device 104 or another computer system of the merchant setting the location radius. In some implementations, the payment service system 108 may limit the radius set by the merchant to a maximum location radius.

If the user device is located outside the geo-location radius 206 of the merchant, the merchant application does not provide an option to conduct a cardless payment transaction with the user. In this case, the user device 102 will indicate it is outside the geo-location radius 206 of the merchant, and the user device 102 can provide more information about the merchant (e.g., as described in reference to FIG. 5). However, the merchant device 104 will be unable to charge the user's financial account, as further described in reference to FIG. 3 and FIG. 6.

Figure 3:
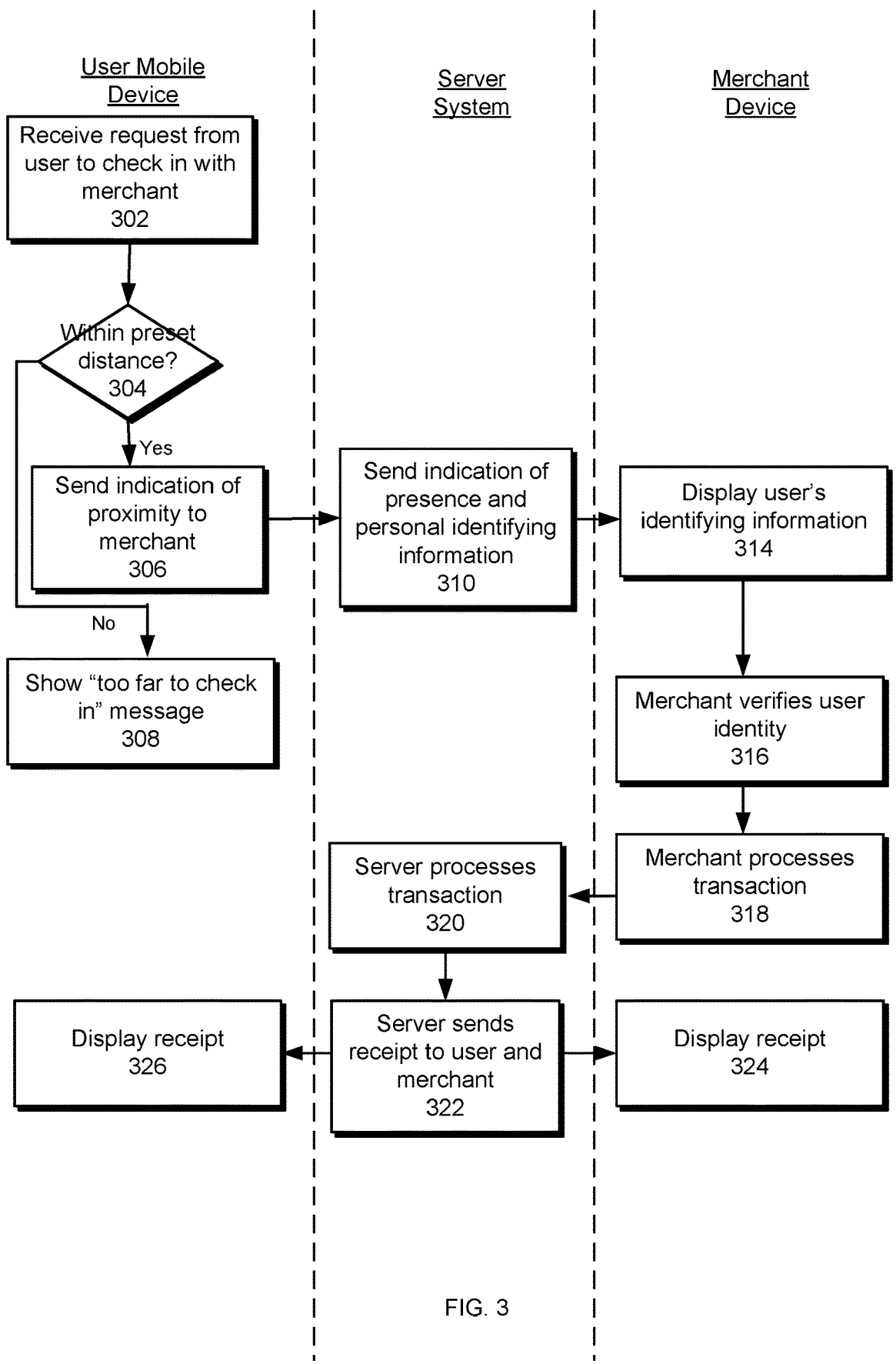
FIG. 3 is a diagram of an example flow chart of the cardless payment system.

If the user device 102 is located within the geo-location radius 206 of the merchant, the user can "check-in" with the merchant using an application on the user device 102 as further described in reference to FIG. 3 and FIG. 5. The user can configure the application to automatically "check-in" with the merchant once the user is within the geo-location radius 206 of the merchant, which will be further described below. In some implementations, the user can configure the application to set a maximum amount that can be charged per transaction with the merchant.

Checking in with a merchant allows the merchant application to display an option to charge the user's financial account using a cardless payment transaction. In essence, checking in constitutes a consent by the user to conduct a cardless transaction with the merchant. This consent differs from actual authorization of the transaction, which the user would provide, e.g., verbally, upon learning the amount of the transaction.

In some implementations, in order to determine whether user device 102 is within the geo-location radius 206 of the merchant device 104, the merchant's location, e.g., address, and the geo-location radius 206 for the merchant are provided to the user device 102. The user device 102 can then use a geofencing function. For example, the user device 102 determines its own location, e.g., based on GPS information, cellphone data, wireless network data, or the like, and then determines whether its own location is within the geo-location radius 206 of the merchant location.

FIG. 3 is a diagram of an example flow chart of process conducted with the cardless payment system 100. The process conducted with the cardless payment system 100 involves relationships between a user's mobile device, a server system, and a merchant's device. The server system can reside in the payment service system 108 and be configured to send and receive communications between the user device and the merchant device. The server system can include the servers 112. The communications can be encrypted using secure protocols built into the user device, server system, and merchant device. In some implementations, this process is implemented through the applications installed on both the user's mobile device and the merchant's device.

In a typical situation, the user launches the user application on the mobile device. The mobile device then displays a graphical user interface (discussed further below with reference to FIG. 4A). In launching the user application, the mobile device 102 directs a request to the server system to identify merchants that will perform cardless payment transactions. The request can be accompanied by location information, e.g., as determined by the mobile device 102. The server system receives the request, and selects one or more merchants based on the location information from the customer and the stored location information for the merchant. At least an identification of the merchant and the location information for the merchant is sent to the mobile device 102. Thus, the list of merchants can be displayed by the mobile device without prior entry of the user of any other search terms or search restrictions.

The user may input a request for further information about a merchant, e.g., tap the name of the merchant in the list displayed by the user application, or press a "More Info" button on the user interface of the user application. In response, the user device can display further information received from the merchant, e.g., the list of goods or services available, operating hours, and phone number.

The user sends an indication of consent to perform a cardless payment transaction with the merchant to the server system. For example, the user can request to "check in" with a merchant by interfacing with the user application on the user device (step 302); this request can constitute the indication of consent.

Alternatively, the request to identify a merchant, the display of information concerning the merchant, and/or the indication of consent, could be entered into a computer other than the user device 102, e.g., the user's home computer, that is logged in to the user's account on the payment service system 108. In any event, should the user indicate consent to perform the transaction, at least an identification of the merchant and the location information for the merchant is sent to the mobile device 102.

The mobile device determines whether it is within the predetermined distance from the merchant (step 304). In some implementations, if the mobile device does not have the current location of the merchant, or if the merchant updated its location information, the merchant location can be pushed or pulled into the mobile device. Whether the mobile device is within the predetermined distance can be determined, e.g., using a geolocation function provided by the operating system of the mobile device. Alternatively, if the user opts in to sharing of location information, the location information of the mobile device can be provided to the server of the payment service system 108, and the server determines the distance between the merchant and the mobile device.

As described above, if the mobile device determines the user's mobile device is not within a predetermined distance (e.g. 500 feet), the mobile device displays a message indicating its inability to check in (e.g., a "too far to check in" message) and rejects the user's request (step 308). In this case, the mobile device can view information about the merchant, but cannot check in. In other words, the merchant cannot charge the user's financial account using a cardless payment transaction until the user is within the predetermined distance and the merchant has the user's consent. This is further described in FIGS. 5A-B.

On the other hand, if the mobile device is within the predetermined distance, the mobile device sends an indication of proximity to the server of the payment service system (step 306). In some implementations, the user can automatically check in. For example, the user first requests to automatically check in with a merchant. While this option is enabled, the mobile device can automatically detect when it is within the predetermined distance and send the indication of proximity, which will be described further in FIGS. 5A-B. The indication of proximity can be determined using wireless network geo-fencing or GPS signals. In some implementations, if the mobile device is not within the predetermined distance, the user application will not permit the indication of consent to be provided. In some implementations, if the mobile device is not within the predetermined distance when an indication of consent is provided, the user application will require that the user again provide an indication of consent when the mobile device is within the predetermined distance.

After the server receives this indication of proximity, the server system sends the indication of the mobile device's presence and personal identifying information to the merchant device (step 310). In some implementations, personal identifying information includes the user's name and picture. Upon receipt of this information, the merchant device displays the user's identifying information (step 314) on the graphical user interface (GUI) of the merchant application. In some implementations, through the GUI of the merchant application, the merchant can select items that the user has sought to purchase. The application can be configured to associate individual prices with each of the merchant's items, and the application can automatically sum the total transaction amount that the user owes. In some implementations, the merchant can enter into the application a total sum of prices for all the items the user wishes to purchase, as well as tax or tip. A user can authorize payment for a transaction by verbally notifying the merchant. For example, a user named John Smith can tell the merchant, "Put this on John Smith." Before or after the user authorizes payment for the transaction, the merchant verifies the user's identity (step 316). In some implementations, the merchant ensures the image displayed on the merchant device matches the user who is present in person. Assuming that the image matches, the merchant selects the transaction using the GUI of the merchant application. In some implementations, the merchant can ask the user for more identifying information before processing the transaction such as the user's birthday, address, or other personal identifying information. After verifying the user's identity, the merchant interfaces with the merchant application to start processing the transaction.

In some implementations, the amount to be charged exceeds a predetermined amount set by the user, the merchant or the cardless payment processor. In this case, the user enters in a PIN associated with the user's account into the merchant device. The merchant device verifies the PIN with the server. Alternatively, the server system may communicate with the user device and cause the user device to request that the user enter the PIN into the user device. In yet another alternative, the server system can ask the user to confirm the payment on the user device, removing the need to enter a PIN.

The merchant's device sends a record of the requested transaction to the server (step 318). The server system continues processing the requested transaction (step 320) by sending the record to the computer system of the card payment network 116, e.g., Visa or MasterCard, and the card payment network 116 then sends the record to the card issuer, e.g., the bank, as described above.

If the transaction fails because it would exceed the credit limit or there are insufficient funds in the financial account, the server notifies the merchant application. In some implementations, the server can notify both the merchant application and user application.

If the transaction succeeds and the server system receives approval from the card payment network 116, the server system communicates this to the merchant device. The merchant device then captures the transaction. In the capture stage, the approved transaction is again routed from the merchant to the credit card processor, card network and card issuer. The record of the transaction in the capture stage can the cardholder's signature (if appropriate), or other information. The capture state can trigger the financial transaction between the card issuer and the merchant. On receipt of an indication from the card network that the transaction has been captured, the server system optionally creates receipts to send to the user, e.g., through the user application and/or through the previously provided contact email, and to the merchant (step 322). Both devices then display the receipt in each of their applications (steps 324, 326). Optionally, the user may be permitted to opt out of notification.

Figure 4C:
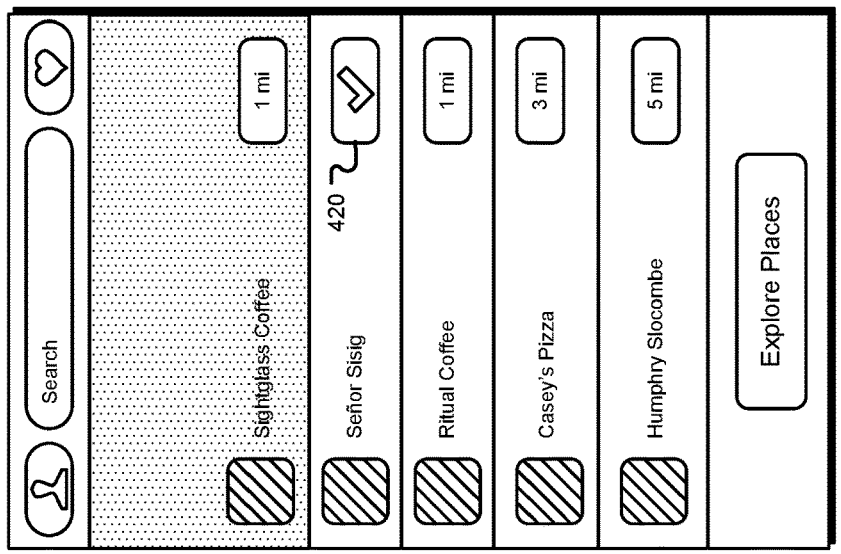
FIGS. 4A-C are diagrams of example views of an application's main page on the user's mobile device.
Figure 4B:
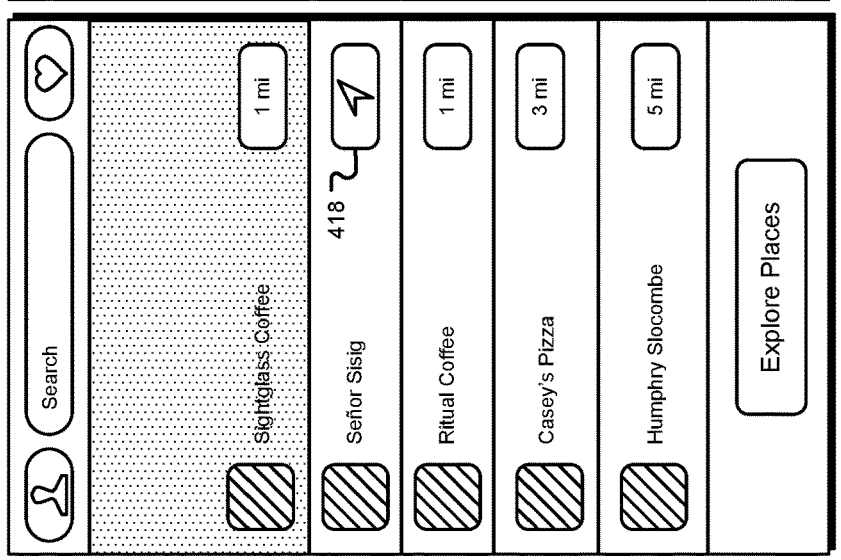
Figure 4A:
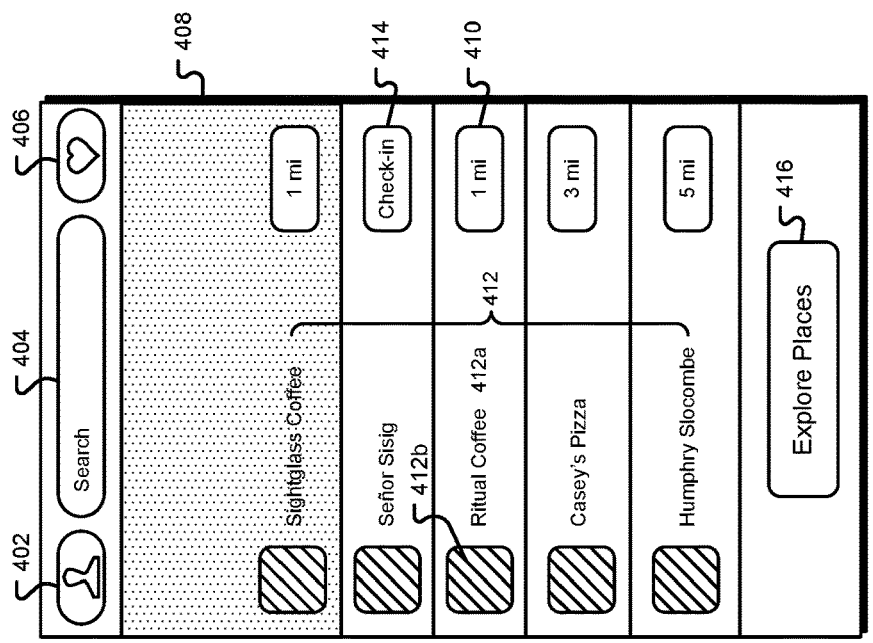

FIG. 4A is a diagram of example view 400 of the user application's main page on a user's mobile device. The user application can retrieve a list of merchants 412 in response to an application query (e.g., on startup of the application). The ranking of merchants that are retrieved within the list will be described further below in reference to FIGS. 8 and 9. The application can display the list of merchants 412. The list of merchants can be organized into a plurality of rows, each row containing the name 412a of a single merchant. The list can also include an icon 412b for each merchant, e.g., located in the row with the name of the merchant. For example, each merchant's icon 412b can be located on the left side of the name 412a of the merchant. In some implementations, a cover image 408 for a merchant, e.g., the first merchant in the list, is displayed. The application can display a distance 410 that a merchant is from a current location of the mobile device. Again, the distance 410 can be located in the row with the name 412a of the merchant, e.g., on the right side of the name 412 of the merchant.

Each merchant can be represented with a custom-designed "card". In some implementations, tapping the row containing the name 412a of the merchant, or tapping the name 412a of the merchant, will cause the user's mobile device to display more information regarding the respective merchant. In some implementations, the additional merchant information is represented by a custom-designed merchant page. For example, the mobile device can display a map around the merchant's area, the merchant's phone number, the merchant's operating hours, or other merchant information, as will be further described in FIGS. 5A and 5B.

The application can present user account information by tapping an account button 402. When provided with input, the application can search for merchants in a search bar 404. For example, the application can send the search query to a cardless payment system and be provided with merchants that are relevant to the search query. Tapping a 'favorites' button 406 can cause the application to retrieve a list of favorites from the cardless payment system and display a list of favorite merchants selected by the user.

To select a favorite, a user can perform a side swipe motion on a merchant listing. This can cause the application to bring up a list of options related to the merchant. For example, the application can display options to favorite the merchant or share the merchant using different communication protocols (e.g., email or social network sharing). If a user selects a merchant as a favorite, the application sends the user's selection to the cardless payment system and associates the selection with the user's account.

If the current location of the mobile device is within a predetermined distance of a merchant, the application can display a representative symbol (e.g., "Check-in" button 414). By tapping the check in button, the application can perform the check in step described above in reference to FIG. 3. If the mobile device's current location is not within the predetermined distance, the application can display a distance 410 from the mobile device to the merchant. The application also allows the user to "Explore Places" 416. In some implementations, this opens a list of nearby or featured merchants that are associated with the cardless payment system. A user then has an option to learn more about one of the merchants in the list.

FIG. 4B is a diagram of an example view of the application showing an auto check-in button 418. In some implementations, the application displays a representative symbol (e.g., an auto-check in button 418) next to each merchant that the user has established for automatically checking in. For example, if the user has previously selected to automatically check into a merchant, the application will display the auto-check in button 418 next to the merchant. This can be shown regardless of whether the mobile device is inside or outside the predetermined radius from the merchant. The user can conduct a transaction with this merchant as described in reference to FIGS. 3 and 5.

FIG. 4C is a diagram of an example view of the application showing a representative symbol (e.g., a check mark 420) next to each merchant that the user has already checked into. The user can conduct a transaction with this merchant as described above in reference to FIG. 3.

Within the row for a given merchant, the distance indication 410, check-in button 414, auto-check in icon and check in icon 420 can each be displayed in the same location, e.g., only one is displayed at a time, e.g., on the right side of the name 412 of the merchant. For example, the text or icon within the button can change depending on which state is to be displayed. Optionally, the various buttons for merchants in different rows can be horizontally aligned on the display.

Figure 5B:
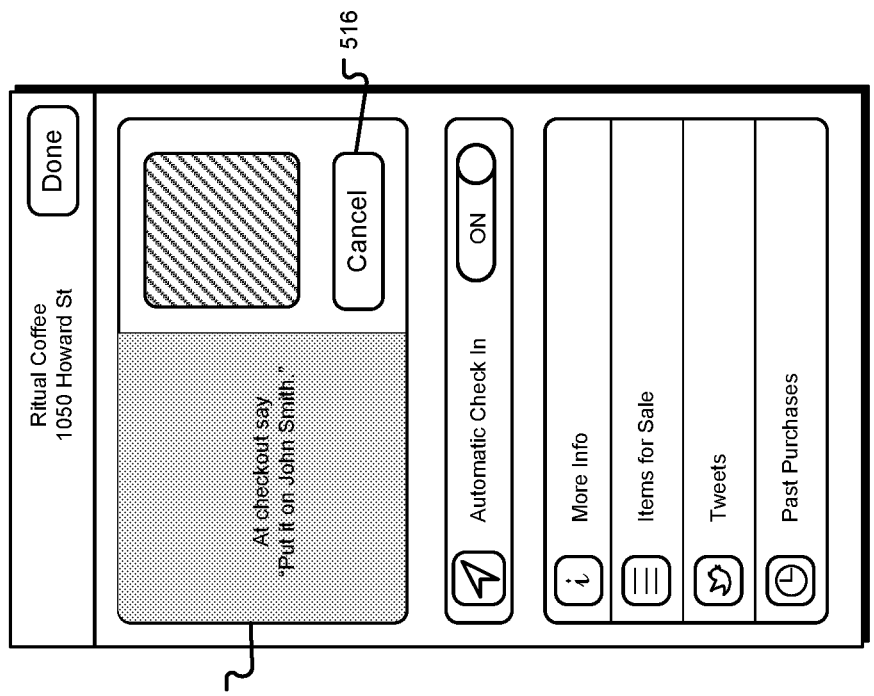
FIGS. 5A-B are diagrams of example application views of a user that has selected a merchant.
Figure 5A:
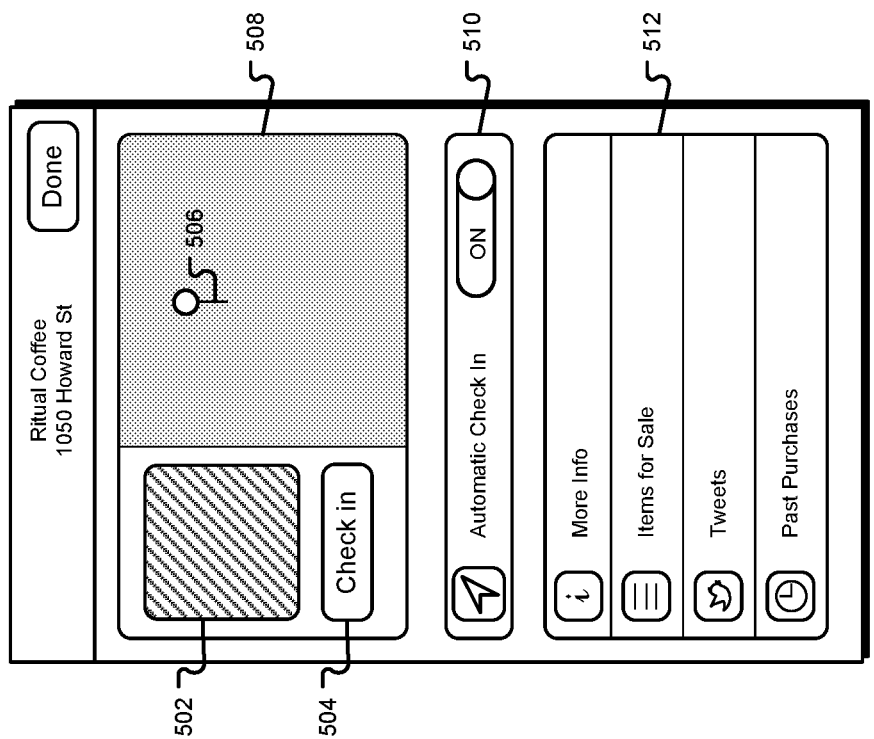

FIG. 5A is a diagram of an example application view that displays information about a merchant when a user is not checked into the merchant. The merchant in the Figure is a coffee shop: "Ritual Coffee." The application can show the name of the merchant, the merchant's address, or the merchant's logo 502. In some implementations, if the mobile device is within a predetermined distance of the merchant, the application displays a check in button 504. The check in button can operate as described above in reference to FIG. 3. If the mobile device is not within the predetermined distance, the application can display a "too far to check in" message as described in reference to FIG. 3.

In some implementations, a user can automatically check into the merchant 510. If this is turned on, the user has given consent to check in automatically whenever the user's mobile device is within the predetermined distance from the merchant. The mobile device then can automatically detect in the background when it is within the predetermined distance and automatically sends, also in the background, an indication of proximity to a server in the payment service system as described above. The user can choose to engage in a cardless payment transaction with the merchant without ever bringing the application to the foreground. Therefore, in some implementations, this removes the need to run the application on a main thread of the device's processor. In other words, the user does not need to start the application when inside the predetermined distance and tap "Check in". In practice, with Auto Check In turned on, John Smith, holding his mobile device 502, can walk to a merchant from outside the predetermined distance, order an item for sale, and pay using the cardless payment system without interfacing with his mobile device 502 at the point of sale. In some implementations, the cardless payment system can limit the "auto-check in" functionality to merchants with a fixed location for security reasons.

In some implementations, the application can display additional information 512 about the merchant. The application can retrieve this information from the cardless payment system. The information can include merchant operating hours, merchant contact information, or other custom information provided by the merchant. In some implementations, the application displays items for sale at the merchant. The items for sale can be provided by the merchant or another system (e.g., the cardless payment system). The application can display merchant updates through social media (e.g., tweets). The application can also display past purchases made by the user. If a user selects this option, the application requests this information from the cardless payment system. The cardless payment system retrieves this information from a database containing the information and provides it to the application.

FIG. 5B is a diagram of an example application view that displays information about a merchant when a user is checked into the merchant. In some implementations, because the user's credit card is already in the cardless payment system, the user does not need to physically give a credit card to the merchant. For example, once a user named John Smith wants to checkout with a few items, John Smith can pay by verbally telling a cashier "Put it on John Smith" 514. The cashier can verify John's identity as described above. A user can also press a "Cancel" button 516 to close the transaction for the merchant. Closing the transaction will prevent the merchant and the merchant's device from charging the user using a cardless payment transaction. In some implementations, merchants can also close the transaction on the merchant device; information that the transaction is closed is transmitted to the server system and then to the mobile device, causing the transaction (if being displayed) to close on the mobile device as well. In some implementations, transactions automatically close after they have been approved. In some implementations, transactions automatically close after a preset amount of time, e.g., if no transaction has occurred.

Figure 6:
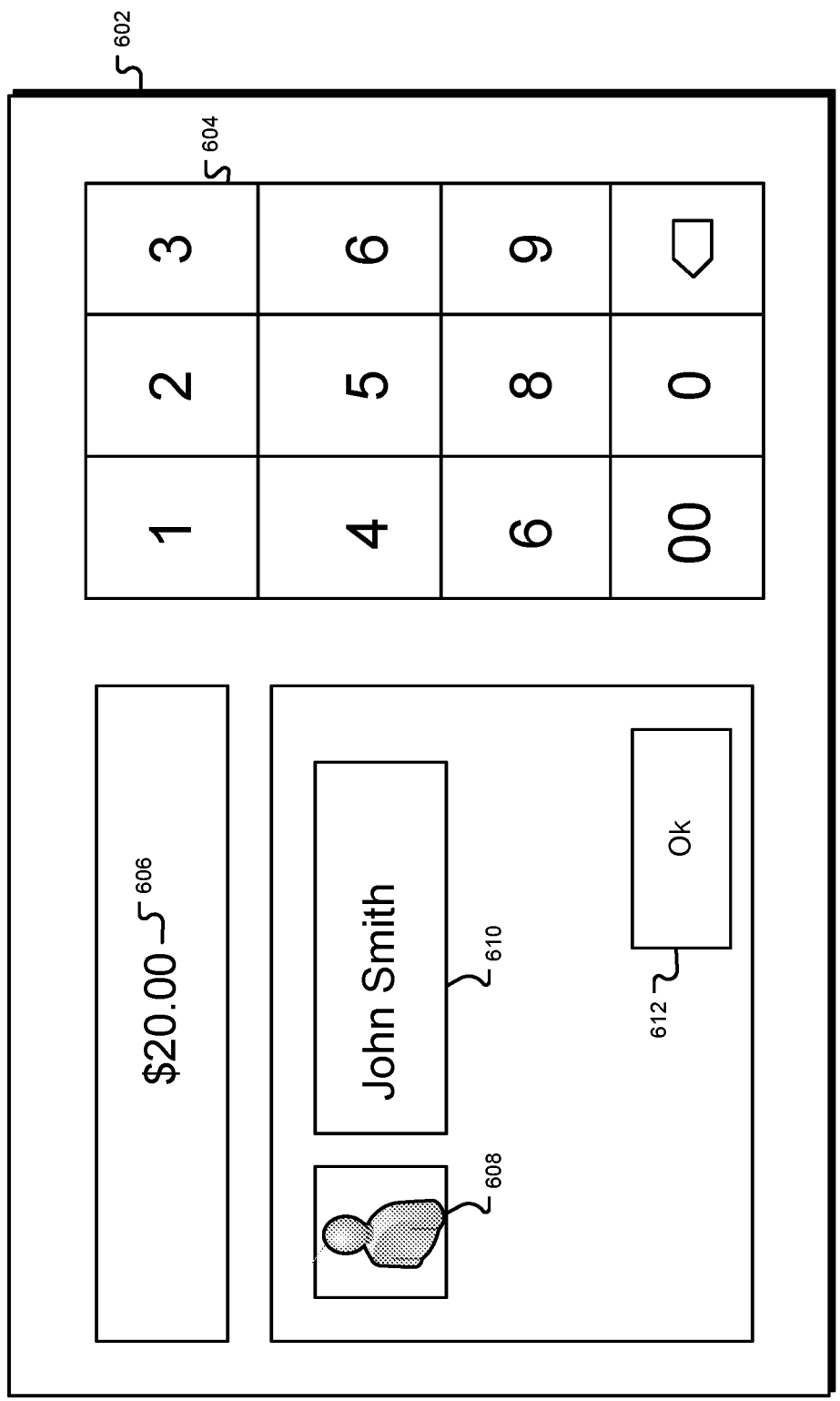
FIG. 6 is a diagram of an example view of a merchant device's application.

FIG. 6 is a diagram of an example view 600 of a merchant device's application 602. If a user is associated with the cardless payment system and is within the predetermined distance from the merchant, the device can display the user's identifying information in the application. In some implementations, the identifying information includes the user's name 610, picture 608, phone number, email address, or other personal identifying information. In some implementations, after verifying the user's identity using the identifying information, the merchant enters in an amount 606 into the application using the keypad 604, shows the user the amount to be charged, and taps the "Ok" button 612 to cause the device to process the transaction.

Figure 7:
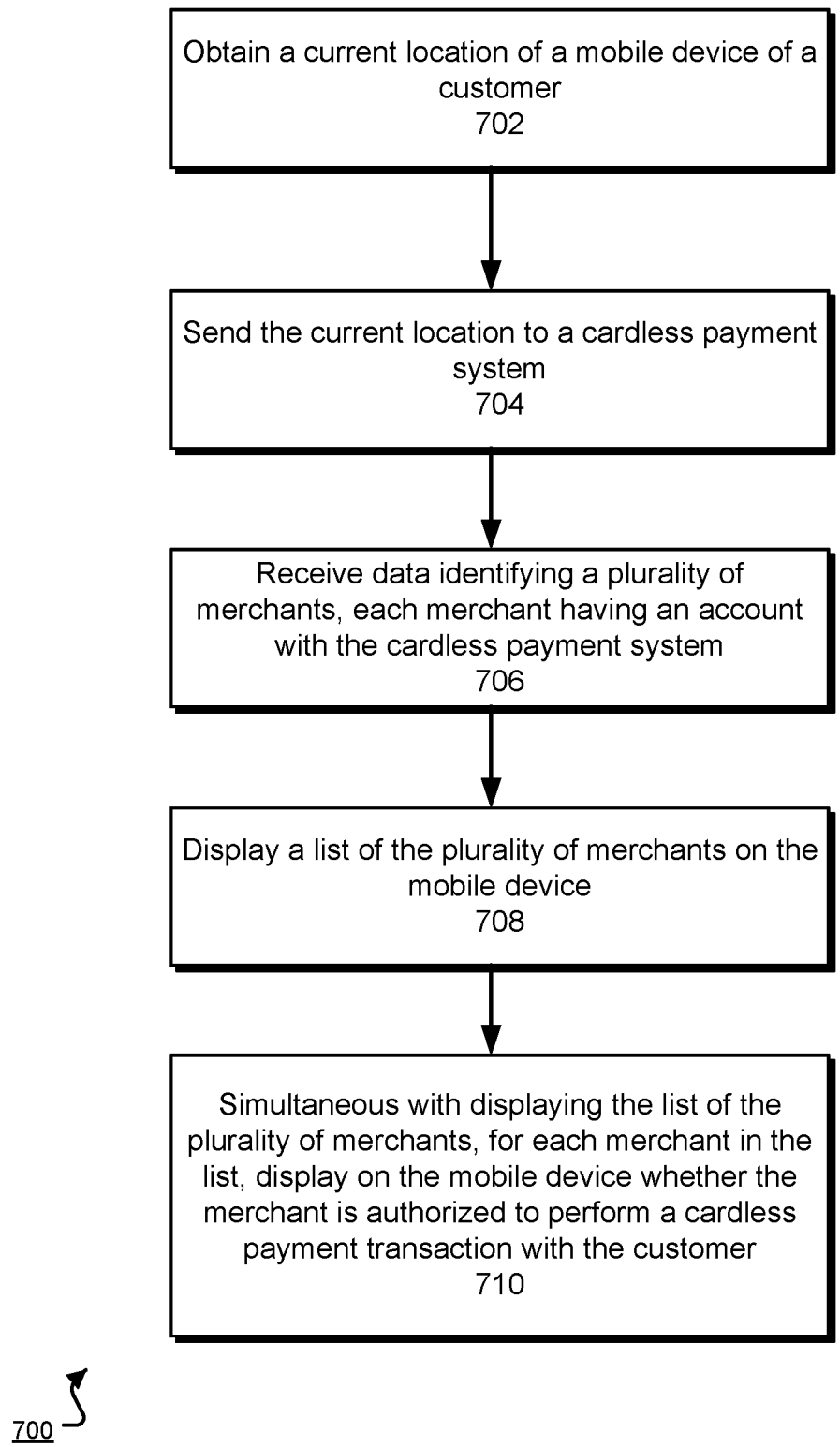
FIG. 7 is a flow chart of an example method of displaying a GUI of an application for cardless payment transactions.

FIG. 7 is a flow chart of an example method 700 of displaying a GUI of an application for cardless payment transactions. The user device obtains a current location of a mobile device of a customer 702. The user device sends the current location to a cardless payment system 704. The user device receives data identifying a plurality of merchants, each merchant having an account with the cardless payment system 706. The user device displays a list of the plurality of merchants on a mobile device 708. Simultaneous with displaying the list of the plurality of merchants, for each merchant in the list, the user device displays whether the merchant is authorized to perform a cardless payment transaction with the customer 710.

Figure 8:
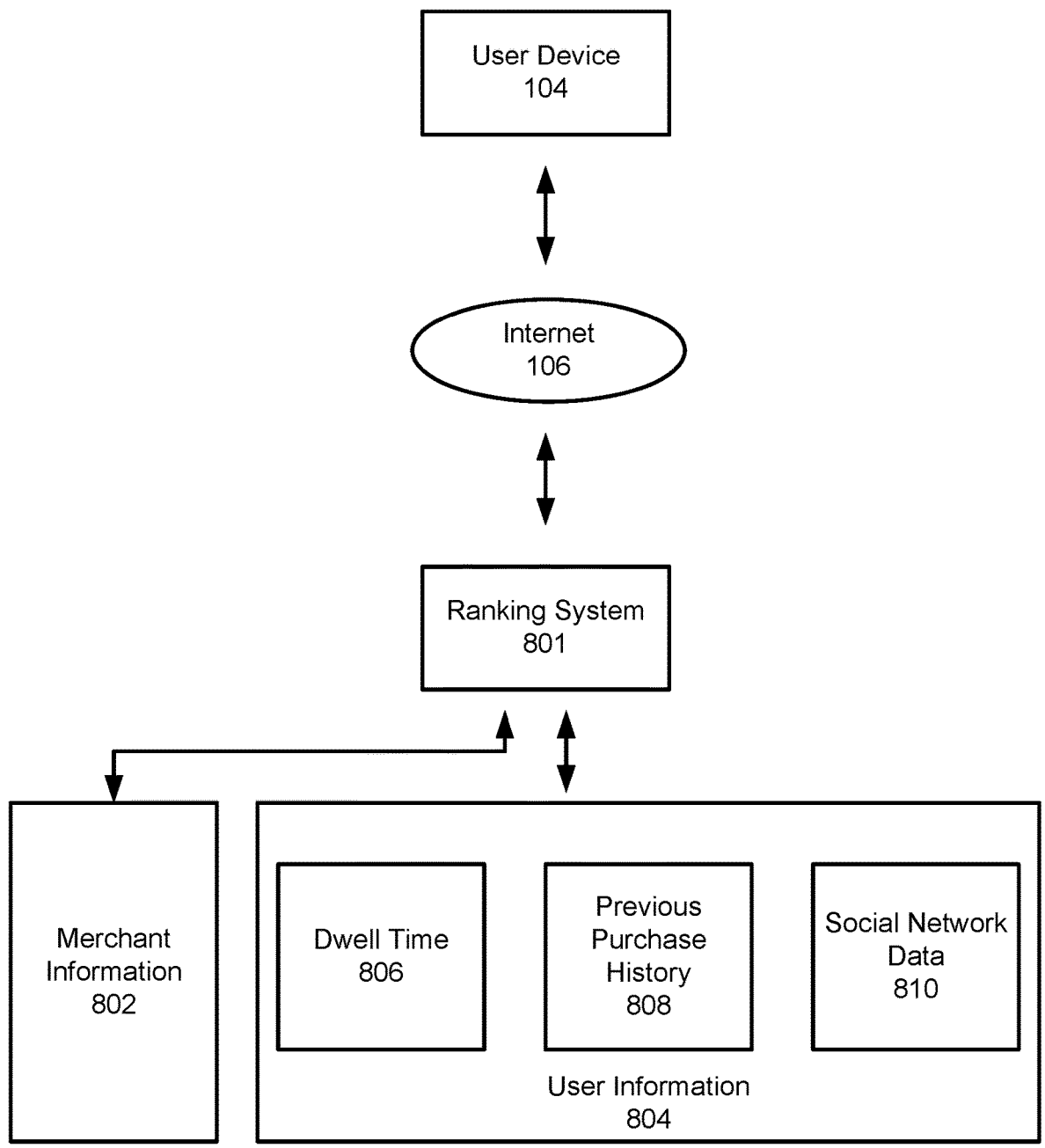
FIG. 8 is a schematic illustration of the architecture of an example merchant ranking system.

FIG. 8 is a schematic illustration of the architecture 800 of an example ranking system 801. The overall system 800 includes a user device 102 connected to the ranking system 801 through a network 106, e.g., the components described above in reference to FIG. 1. In some implementations, the ranking system is a part of a cardless payment system. The user device 104 can request a list of merchants from the ranking system 801 over the Internet 106. The ranking system 801 can provide the user device 102 with a list of relevant merchants as described above in reference to FIG. 4A.

The ranking system 801 obtains merchant information 802 and user information 804 from one or more databases in the cardless payment system. Merchant information 802 can include a merchant's name, icon, location, operating hours, contact information, items for sale, or other information about the merchant. User information can include dwell time 806 of a user's mobile device around a merchant location, previous purchase histories of users 808, or social network data 810. User information will be further described below in reference to FIG. 9. A user can opt in (e.g., give consent) to share user information 804 to be used in the ranking system.

Figure 9:
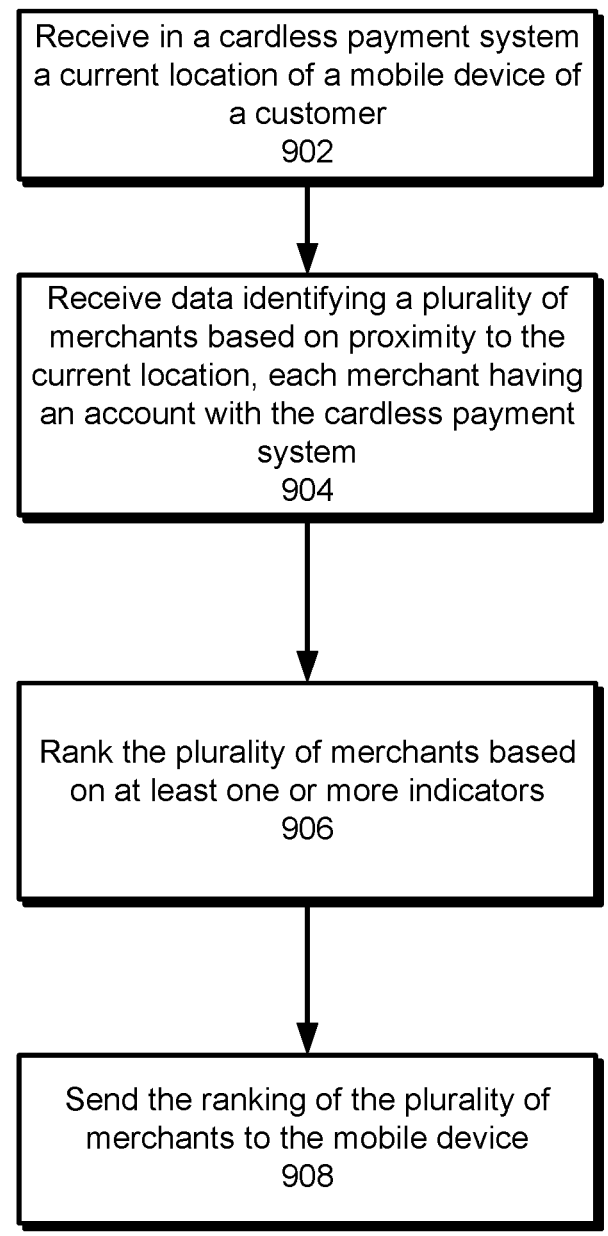
FIG. 9 is a flow chart of an example method of ranking merchants performed by a ranking system.

FIG. 9 is a flow chart of an example method 900 of ranking merchants performed by a ranking system. A user's mobile device can send the current location on startup of an application for cardless payment transactions. The system receives a current location of the mobile device 902. The system requests for a plurality of merchants (e.g., represented as a list) that are located near the current location 904. The system can limit the plurality of merchants to include merchants that are associated with the cardless payment system (e.g., merchants that have created merchant accounts as described above in reference to FIG. 1).

In some implementations, after receiving the plurality of merchants, the system ranks not only on location, but also at least one or more other indicators 906. Some of the one or more other indicators are weighed more heavily or lightly than others when determining ranks of merchants.

The ranking system can consider previous purchase history. Conventional credit card processors have access to data including a merchant's name, a total transaction amount, and a date. In addition to this data, the ranking system can also access previous purchase history that includes data about itemized purchases at merchants. The itemized purchase data can include a name for each item purchased, a stockkeeping unit (SKU) to uniquely identify items, universal product code (UPC), or a price for each item.

Merchants can provide an inventory of item information (e.g., an item's price, name, SKU or other details) to the cardless payment system. In some implementations, merchants provide this information during creation of a merchant account.

In some implementations, the cardless payment system tracks a user's previous purchase history whenever the user conducts a cardless payment transaction. In some implementations, previous purchase history can be acquired from transactions linked to financial accounts of the user in a payment service system (e.g., a payment service system as described in reference to FIG. 1). Again, the user can opt-in to share previous purchase history with the ranking system.

Previous purchase history can include purchase history of the user or of other accounts associated with the user (e.g., friends or followers of the user). The system can consider how recently or frequently the user bought the previous purchase. For example, if a user purchases coffee from a specific merchant every day, the system can highly rank the commonly frequented merchant. In some implementations, the system considers how similar the previous purchase was based on the merchant or the type of item purchased (e.g., whether the user or the user's friend previously purchased a coffee or a computer). For example, the system can highly rank merchants that sell items similar to the previous purchase.

The ranking system can consider dwell time. Dwell time can be the amount of time a mobile device lies within a dwell distance of the merchant or some other geographic region, e.g., within a zipcode area. In some implementations, the dwell distance is the same as the predetermined distance mentioned above in reference to FIG. 3. In alternative implementations, the dwell distance is shorter than the predetermined distance mentioned above in reference to FIG. 3. For example, the dwell distance can be a few feet from the location of the merchant. To calculate the dwell time, a user device can use a geofencing or other location-based function to determine a location. For example, the user device determines its own location, e.g., based on GPS information, cellphone data, wireless network data, or the like, and then determines whether its own location is within the dwell distance of the merchant location. Using the user device's location, the user device can accumulate tracking data. Tracking data can include the amount of time (e.g., using a timer) that the user device is within the dwell distance of the merchant. The amount of dwell time at a merchant location can be directly proportional to a user's interest in the merchant. As mentioned above, the user can opt-in to share dwell time with the ranking system.

The ranking system can consider social network data. The system can request data from a social network application program interface (API). The data can include the user's interests as well as the user's friends' interests. For example, the system can highly rank merchants that are frequently mentioned in social network data.

In some implementations, the system considers one or more indicators that include a time of day, a date, or one or more user-selected favorites. For example, the ranking system can highly rank merchants that are selected as favorites over merchants that have a low dwell time. The ranking system can also highly rank merchants that offer dinner during evening hours instead of presenting merchants that only offer breakfast.

In some implementations, the system considers merchants that are featured. Featured merchants can be presented as higher ranked than other merchants (e.g. because the featured merchants paid an advertising fee).

In some implementations, the one or more indicators include merchant interests of other customers that are associated with the user. For example, the system can determine whether two users are scheduled to meet for lunch (e.g., through an API). The system can then highly rank merchants that appeal to both users' interests (e.g., through selected favorites, previous purchase history, or other indicators mentioned above).

After ranking the plurality of merchants, the system sends the ranked results and other associated merchant information (e.g., merchants' names, addresses, operating hours, or contact information) to the mobile device 908. The merchants are displayed in the list in the order of the ranked results. As noted above, the list of merchants can be displayed by the mobile device without prior entry of the user of any other search terms or search restrictions.

However, the user can also enter search terms using search bar 404. The search terms can be sent to the payment service system 108, which can generate a new ranking and send the new ranked results to the mobile device 908.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, by an application associated with a cardless payment system that facilitates cardless payment transactions, a current geographical location of a mobile device associated with a user;

generating a ranked list of merchants that are within a threshold distance of the current geographical location of the mobile device, the ranked list of merchants being generated based on a weighted combination of merchant information including information on products offered by each merchant and purchase trends of the user, the user and each of the merchants having a corresponding account with the cardless payment system that includes respective payment information of the user and the merchants for conducting cardless payment transactions;

receiving, by the application and at a first time, user input to enable an auto check-in feature for at least one merchant of the list of merchants, the auto check-in feature authorizing the at least one merchant to perform a cardless payment transaction with the user using respective accounts of the user and the at least one merchant with cardless payment system;

sending, by the mobile device to the cardless payment system without further input from the user, an indication of consent for the at least one merchant to perform a cardless payment transaction using the corresponding account of the user with the cardless payment system;

displaying the list of merchants on a display of the mobile device including the at least one merchant;

when the current geographical location of the mobile device is within a predetermined distance of a current geographical location of the at least one merchant and while the application is running in a background of the mobile device, automatically checking in by the application, with a point of sale device of the at least one merchant at a second time subsequent to the first time to allow processing of a cardless payment transaction between the at least one merchant and the user using respective accounts of the user and the at least one merchant with the cardless payment system without an exchange of financial information between the user and the at least one merchant; and receiving, by the application, a receipt from the cardless payment system indicating that the cardless payment transaction has been processed.

2. The method of claim 1, further comprising:

receiving, from the cardless payment system, data indicating the current geographical location of the at least one merchant.

3. The method of claim 1, further comprising:

receiving additional user input indicating a maximum amount of fees that can be charged for the cardless payment transaction; and setting an approval limit on the cardless payment transaction based at least in part on the maximum amount of fees.

4. The method of claim 1, further comprising:

receiving, by the application, a picture of the user; and sending, by the application and to the cardless payment system, the picture of the user to associate with the account of the user at the cardless payment system.

5. The method of claim 1, further comprising:

sending, by the cardless payment system and to the point of sale device associated with the at least one merchant, information identifying the user, the information including a picture and a name of the user;

receiving, by the cardless payment system and from the point of sale device, an indication to proceed with processing the cardless payment transaction; and processing the cardless payment transaction.

6. The method of claim 1, further comprising:
receiving, by a merchant application associated with the point of sale device of the merchant, merchant input to perform the cardless payment transaction with the user associated with the mobile device;
sending, by the merchant application and to the cardless payment system, a request to perform the cardless payment transaction;
receiving, by the merchant application and from the cardless payment system, information identifying the user, the information including a picture and a name of the user;
receiving, by the merchant application, merchant input indicating a confirmation of an identity of the user based on the information; and
sending, by the merchant application and to the cardless payment system, an indication to proceed with processing the cardless payment transaction.

7. The method of claim 1, further comprising:
displaying the receipt on the mobile device of the user interface.

8. The method of claim 1, wherein
the information on products offered by each merchant includes information on each merchant's inventory, prices of items offered by each merchant and sales data associated with each merchant, and
the trends of the user include information on past transactions by the user and information on user's dwell time around each merchant.

9. A system for enabling cardless payment transactions, the system comprising:
one or more processors; and
a memory having computer-readable instructions, which when executed by the one or more processors, cause the one or more processors to provide a user application to:
determine a current geographical location of a mobile device;
generate a ranked list of merchants that are within a threshold distance of the current geographical location of the mobile device, the ranked list of merchants being generated based on information on products offered by each merchant and purchase trends of a user associated with the mobile device, the user and each of the merchants having a corresponding account with a cardless payment system that includes respective payment information of the user and the merchants for conducting cardless payment transactions;
receive, at a first time, user input to enable an auto check-in feature for at least one merchant of the list of merchants, the auto check-in feature authorizing the at least one merchant to perform a cardless payment transaction with the user using respective accounts of the user and the at least one merchant with cardless payment system;
provide for display of the list of merchants on the mobile device including the at least one merchant;
upon determining that the current geographical location of the mobile device is within a predetermined distance of a current geographical location of the at least one merchant and while the user application is running in a background of the mobile device, perform an automatic check in of the user, at a second time after the first time, with a point of sale device of the at least one merchant to enable processing of a cardless payment transaction between the at least one merchant and the user using respective accounts of the user and the at least one merchant with the cardless payment system without an exchange of financial information between the user and the at least one merchant; and
receive, by the application, a receipt from the cardless payment system indicating that the cardless payment transaction has been processed.

10. The system of claim 9, further comprising:
a location sensing component communicatively coupled to the one or more processors and configured to determine the current location of the mobile device based on at least one of Global Positioning System (GPS) data, cellphone data, or wireless network data.

11. The system of claim 9, wherein the one or more processors are configured to execute the computer-readable instructions to:
receive data indicating the location of the at least one merchant; and
determine that the current location of the mobile device is within the predetermined distance of the location of the at least one merchant based at least in part on the data indicating the location of the merchant.

12. The system of claim 9, wherein the one or more processors are configured to execute the computer-readable instructions to:
receive user input indicating a maximum amount of fees that can be charged for cardless payment transactions; and
set an approval limit on the cardless payment transaction based at least in part on the maximum amount of fees.

13. The system of claim 9, wherein the one or more processors are configured to execute the computer-readable instructions to:
receive, from a merchant application on a point of sale terminal associated with the at least one merchant, a request to perform the cardless payment transaction with the user;
determine that an indication for the merchant to carry out the cardless payment transaction has been previously received from the mobile device through activation of the auto check-in feature;
send, to the merchant application, information identifying the user, the information including a picture and a name of the user;
receive, from the merchant application, an indication to proceed with processing the cardless payment transaction; and
process the cardless payment transaction.

14. The system of claim 9, further comprising:
a merchant application executable by one or more processors of a point of sale terminal associated with the merchant to:
receive merchant input for performing the cardless payment transaction with the user associated with the mobile device;
receive, from the cardless payment system, information identifying the user, the information including a picture and a name of the user;
receive merchant input indicating a confirmation of an identity of the user based on the received information; and
send, to the cardless payment system, an indication to proceed with processing the cardless payment transaction.

15. The system of claim 9, wherein
the information on products offered by each merchant includes information on each merchant's inventory, prices of items offered by each merchant and sales data associated with each merchant, and the purchase trends of the user include information on past transactions by the user and information on user's dwell time around each merchant.

16. One or more non-transitory computer-readable media having instructions stored thereon, which, when executed by one or more processors, cause the one or more processors to provide an application to:

determine a current geographical location of a mobile device;

generate a ranked list of merchants that are within a threshold distance of the current geographical location of the mobile device, the ranked list of merchants being generated based on a weighted combination of merchant information including information on products offered by each merchant and purchase trends of a user associated with the mobile device, the user and each of the merchants having a corresponding account with a cardless payment system that includes respective payment information of the user and the merchants for conducting cardless payment transactions;

receive, at a first time, user input to enable an auto check-in feature for at least one merchant of the list of merchants, the auto check-in feature authorizing the at least one merchant to perform a cardless payment transaction with the user using respective accounts of the user and the at least one merchant with cardless payment system;

display the list of merchants on a display of the mobile device including the at toast one merchant;

when the current geographical location of the mobile device is within a predetermined distance of a current geographical location of the at least one merchant and while the application is running in a background of the mobile device, perform an automatic check in, at a second time after the first time, with a point of sale device of the at least one merchant to enable processing of a cardless payment transaction between the at least one merchant and the user using respective accounts of the user and the at least one merchant with the cardless payment system without an exchange of financial information between the user and the at least one merchant; and receive, by the application, receipt from the cardless payment system that indicating that the cardless payment transaction has been processed.

17. The one or more non-transitory computer-readable media of claim 16, wherein the execution of the instructions by the one or more processors cause the one or more processors to determine the current location of the mobile device based on at least one of Global Positioning System (GPS) data, cellphone data, or wireless network data.

18. The one or more non-transitory computer-readable media of claim 16, wherein the execution of the instructions by the one or more processors cause the one or more processors to:

receive data indicating the location of the at least one merchant; and determine that the current location of the mobile device is within the predetermined distance of the location of the at least one merchant is based at least in part on the data indicating the location of the merchant.

19. The one or more non-transitory computer-readable media of claim 16, wherein the execution of the instructions by the one or more processors cause the one or more processors to:

receive user input indicating a maximum amount of fees that can be charged for cardless payment transactions; and set an approval limit on the cardless payment transaction based at least in part on the maximum amount of fees.

20. The one or more non-transitory computer-readable media of claim 16, wherein the execution of the instructions by the one or more processors cause the one or more processors to:

receive user input via the user interface, the input being at least for enabling the auto check-in feature for the at least one merchant.

21. The one or more non-transitory computer-readable media of claim 16, wherein the execution of the instructions by the one or more processors cause the one or more processors to:

receive a picture of a user associated with the mobile device; and send, to the cardless payment system, the picture of the user to associate with the account of the user at the cardless payment system.

22. The one or more non-transitory computer-readable media of claim 16, wherein the execution of the instructions by the one or more processors cause the one or more processors to:

receive information associated with the receipt for the cardless payment transaction; and display the receipt.

23. The one or more non-transitory computer readable media of claim 16, wherein the information on products offered by each merchant includes information on each merchant's inventory, prices of items offered by each merchant and sales data associated with each merchant, and the purchase trends of the user include information on past transactions by the user and information on user's dwell time around each merchant.

* * * * *